United States Patent [19]
Akai et al.

[11] Patent Number: 6,090,291
[45] Date of Patent: Jul. 18, 2000

[54] WASTE PROCESSING METHOD AND WASTE PROCESSING APPARATUS

[75] Inventors: Yoshie Akai, Yokohama; Yoshikazu Matsubayashi, Yokosuka; Yasushi Yamaguchi, Kawaguchi; Kazuya Yamada; Atsushi Ohara, both of Tokyo, all of Japan

[73] Assignee: Kabushiki Kaisha Toshiba, Kawasaki, Japan

[21] Appl. No.: 09/136,589

[22] Filed: Aug. 19, 1998

[30] Foreign Application Priority Data

Aug. 20, 1997 [JP] Japan ................................. 9-223552
May 8, 1998 [JP] Japan ................................. 10-126415
Aug. 17, 1998 [JP] Japan ................................. 10-230549

[51] Int. Cl.$^7$ ............................... A62D 3/00; C02F 11/08
[52] U.S. Cl. ........................ 210/669; 210/761; 210/743; 210/748; 210/188; 210/205
[58] Field of Search ...................... 210/669, 743, 210/748, 761, 767, 187, 188, 205

[56] References Cited

U.S. PATENT DOCUMENTS 5,240,619  8/1993  Copa et al. .
5,358,646  10/1994  Gloyna et al. .

FOREIGN PATENT DOCUMENTS 1-38535    8/1989   Japan .
WO81/00854 4/1981   WIPO .
WO95/02556 1/1995   WIPO .
WO95/26929 10/1995  WIPO .

OTHER PUBLICATIONS

Sue et al, "Solubility Measurement of Metal Oxides in Subcritical, Supercritical Water", Chemical Engineering society 63rd Annual Meeting, p. 24.

Foy et al., "Hydrothermal Processing of Chlorinated hydrocarbons in a Titanium Reactor," Environ. Sci. Technol., 30:270–99 (1996).

Copy of Communication (dated Nov. 26, 1998) from European Search Report.

*Primary Examiner*—David A. Simmons
*Assistant Examiner*—Chester T. Barry
*Attorney, Agent, or Firm*—Finnegan, Henderson, Farabow, Garrett & Dunner, L.L.P.

[57] ABSTRACT

A waste processing method decomposing an organic substance or an inorganic substance contained in organic wastes or inorganic wastes by holding a mixture of the organic wastes or the inorganic wastes and a medium, which is in its supercritical state, for a pre-determined time period, in which the hydrogen ion concentration of the medium is $10^{-4}$ mol or more to 1 kg of the medium.

A waste processing method having a step of decomposing all or almost all of an organic substance included in organic wastes into lower-molecular-weight products by holding the organic wastes in a medium, which is in its supercritical state, for a pre-determined time and a step of oxidizing and decomposing the lower-molecular-weight products into carbon dioxide ($CO_2$) and/or water ($H_2O$) by holding a mixture of an oxidant and the lower-molecular-weight products in the medium, which is in its subcritical state, for a pre-determined time period.

58 Claims, 19 Drawing Sheets

WASTE PROCESSING METHOD AND WASTE PROCESSING APPARATUS

BACKGROUND OF THE INVENTION

1. Field of the Invention

The present invention relates to a processing method and a processing apparatus of organic wastes, and a processing method and a processing apparatus of inorganic wastes.

2. Description of Related Art

In recent years, disposal of organic wastes including resin such as plastic containers or polyvinyl chloride, or radioactive materials is becoming a big problem. Conventionally, the organic wastes are disposed of by incineration, however, with such a processing method, there are such problems that hazardous materials such as dioxin, nitrogen oxides and the like are generated, and a large scale apparatus recovering these hazardous materials is required.

In addition, inorganic wastes in the field of atomic energy contain a huge volume of sodium nitrate other than radioactive materials. Thus, radioactive materials are buried with sodium nitrate as a solidified body in a processing field located underground. As a result of the recent study of the underground environment, it is reported that the underground is low in its oxygen partial pressure, nitrate ions are likely to become ammonia accordingly. As the result, it is pointed out that there is a likelihood of radioactive material such as plutonium and the like forming a complex with ammonia and being eluted from the solidified body.

Recently, as a method decomposing an organic material, a method employing water under a high temperature and a high pressure (supercritical water) exceeding the critical point of water (temperature: 374° C., pressure: 22.1 MPa) is attracting attention.

The supercritical state denotes a state of a substance which is under a temperature and a pressure exceeding the critical temperature and the critical pressure both of which are the physical quantities inherent to individual compounds, and a substance in this state is called a supercritical fluid.

A method is known in which an organic material and a fluid containing water and oxygen are mixed and the organic material is oxidized/decomposed under a supercritical state exceeding the critical point of water ("Organic material oxidation method in water exceeding supercritical point", Japanese Patent Application No. Sho-56-68414, Registration No.1551862). The supercritical water, being intermediate of liquid and gas in its properties and capable of being mixed with an organic material and oxygen at an arbitrary ratio, can decompose the organic material effectively in a short time.

However, in the supercritical state, since solubility of inorganic materials is remarkably small, there occurs a problem that inorganic materials contained in the organic wastes precipitate on the surface of the reactor, thereby plugging the reactor. The solubility of the inorganic oxides being particularly small, such trouble is likely to be caused accordingly.

For instance, when wastes from an atomic power plant are processed, because of precipitation of radioactive materials, handling is not easy and huge cost is needed for maintenance of the waste processing apparatus.

Therefore, development of a method and an apparatus of decomposing organic wastes by making use of the supercritical state without precipitating inorganic substances is expected.

Further, as described above, if ammonia exists in a solidified body, there is a likelihood of the radioactive materials such as plutonium being eluted from the solidified body. Therefore, development of a waste processing method and an apparatus which, even when the wastes including only inorganic materials are processed, can prevent the nitrate ions from being contained in the solidified body by converting the nitrate ions or nitrate salts to nitrogen, is expected.

SUMMARY OF THE INVENTION

From the above, the present invention was carried out to solve the problems which the conventional technology involves, the object of the present invention is to provide a method and an apparatus effectively decomposing organic wastes or inorganic wastes in a short time period.

This invention is disclosed in Japanese Patent Application No.9-223552 filed on Aug. 20, 1997, No.10-126415 filed on May 8, 1998, and No.10-230549 filed on Aug. 17, 1998, and the entire disclosure thereof is incorporated herein by reference.

A first waste processing method according to the present invention has a step of decomposing all or almost all of an organic substance included in organic wastes into lower-molecular-weight products by holding the organic wastes in a medium, which is in a supercritical state thereof, for a pre-determined time period and a step of oxidizing and decomposing the lower-molecular-weight products into carbon dioxide ($CO_2$) and/or water ($H_2O$) by holding a mixture of an oxidant and the lower-molecular-weight products in the medium in a subcritical state thereof for a pre-determined time period.

According to this method, after an organic substance is decomposed into lower-molecular weight products in supercritical water in the absence of an oxidant, the organic substance is oxidized and decomposed by an addition of the oxidant to subcritical water, in which inorganic substances hardly precipitate. Therefore the organic substance can be effectively decomposed and the inorganic substance is prevented from being precipitated.

Not limiting examples of the organic wastes are paper, wastes, active carbon, asphalt, and various kinds of resins. The organic wastes may contain nitrate, sulfate, chloride, phosphate, silicate, or mixtures thereof.

The organic wastes may include insoluble materials such as sand, gravel, pebble and the like.

Furthermore, some of the resins, such as polyethylene, propylene, PET resin, and various kinds of ion-exchange resins, do not contain an inorganic additive or an organic additive, and others, such as vinyl-chloride, silicone, fiber-reinforced plastic (FRP) and the like, contain an inorganic additive and/or an organo-metallic salt additive.

Examples of the inorganic additives are stabilizers such as lead salt or tin salt, fillers such as $CaCO_3$ or $SiO_2$, flame retardants such as $Al_2(OH)_3$, $Sb_2O_3$, MgO, carbon for conductive or reinforcement use. Lead stearate is an example of the organo-metallic salt additive.

When the organic wastes contain a huge amount of impurities, inorganic additives, or organo-metallic salt additives, the amount of wastes processed at a time is preferably reduced so as to prevent the inorganic substances from being precipitated.

A second waste processing method involving the present invention has a step of decomposing all or almost all of an organic substance included in organic wastes into lowermolecular-weight products by holding the organic wastes in a medium, which is in a supercritical state thereof, for a pre-determined time period, a step of separating insoluble impurities contained in the organic wastes, and a step of oxidizing and decomposing the lower-molecular-weight products into carbon dioxide ($CO_2$) and/or water ($H_2O$) by holding a mixture of an oxidant and the lower-molecular-weight products in the medium in a subcritical state thereof for a pre-determined time period.

According to this method, even if the above described organic wastes include a huge amount of insoluble impurities, inorganic additives, or organometallic salt additives, the organic substance can be effectively decomposed while the inorganic substance in the subcritical medium can be prevented from being precipitated, because the precipitated insoluble impurities are removed after supercritical processing and then the organic substance is oxidized and decomposed by the addition of an oxidant in a subcritical water. Therefore it is not necessary to reduce the processing amount.

In these waste processing methods, it is preferable to adjust the hydrogen ion concentration of the medium to $10^{-4}$ mol or more per 1 kg of medium. The solubility of the inorganic substance is thereby improved, further reducing the precipitation of the inorganic substance.

According to a third waste processing method of the present invention, in a waste processing method of decomposing an organic substance in organic wastes by holding a mixture of the organic wastes and a medium in its supercritical state for a pre-determined time period, in which the hydrogen ion concentration of the medium is $10^{-4}$ mol or more per 1 kg of the medium.

According to this method, by adjusting the hydrogen ion concentration of the medium $10^{-4}$ mol or more to 1 kg of the medium, the inorganic substance can be prevented from being precipitated.

The medium may contain an oxidant.

The organic wastes identical as those of the first or second waste processing method can be processed, however, the organic wastes may contain oxide. It is because, according to this waste processing method, organic wastes containing oxide can be effectively processed.

According to a fourth waste processing method of the present invention, in a waste processing method decomposing an inorganic substance in inorganic wastes by holding a mixture of the inorganic wastes and a medium in its supercritical state for a pre-determined time period, in which the hydrogen ion concentration of the medium is $10^{-4}$ mol or more per 1 kg of the medium.

In the medium of a supercritical state, the inorganic substance can be effectively decomposed. Since the hydrogen ion concentration is adjusted to $10^{-4}$ mol or more per 1 kg of the medium, the decomposed inorganic substance can exist in the fluid without being precipitated.

Preferably the wastes containing only inorganic substances are processed by this method. For instance, a solidified body including alpha-bearing wastes may be processed. The inorganic wastes may contain nitric acid and/or nitrates. However, wastes including some organic substances can be processed by this method.

The medium may contain the oxidant.

A waste processing method of the present invention may have a step of rendering the medium supercritical and a step of obtaining a mixture of the medium in its supercritical state and the organic or inorganic wastes.

Needless to say, after mixing the medium and the organic or inorganic wastes, the obtained mixture can be heated/pressurized to be in a supercritical state.

As the medium, water, carbon dioxide, a hydrocarbon, or mixtures thereof are preferably employed.

In general, in a medium in its supercritical state, substances which are in the gas or liquid phase at room temperature and atmospheric pressure can be mixed uniformly at an arbitrary ratio. Furthermore, in the supercritical medium, a higher mass-transferring speed can be expected as compared with a liquid medium. Therefore, as the supercritical medium of the present invention, water, carbon dioxide, and hydrocarbon all of which have the above-described properties can be used considering the object being processed. In addition, by mixing these media, the critical point thereof can be altered.

At least the stoichiometric value, necessary for completely oxidizing the organic wastes, of oxygen, air, hydrogen peroxide, ozone, or mixtures thereof is preferably used as the oxidant. 1.2 to 10 times the stoichiometric value is more preferable.

To adjust the hydrogen ion concentration, an inorganic acid is desirable to be used, and sulfuric acid or hydrochloric acid is preferably used. However, for instance, an acid (e.g. nitric acid) which pyrolyses under a high temperature is not used suitably.

A first waste processing apparatus of the present invention has a reactor decomposing all or almost all of an organic substance included in organic wastes into lower-molecular-weight products in a medium which is in a supercritical state thereof, an organic waste feeding means for feeding the organic wastes to the reactor, a medium feeding means for feeding the medium to the reactor, an oxidation reactor oxidizing and decomposing the lower-molecular-weight products into carbon dioxide ($CO_2$) and/or water ($H_2O$) with an oxidant in a medium which is in a subcritical state thereof, an oxidant feeding means for feeding an oxidant to the oxidation reactor, and a recovering means for recovering a fluid produced in the oxidation reactor.

A second waste processing apparatus of the present invention has a reactor decomposing all or almost all of an organic substance in organic wastes into lower-molecular-weight products by holding the organic waste in a medium in a supercritical state thereof, and subsequently, oxidizing and decomposing the lower-molecular-weight products into carbon dioxide ($CO_2$) and/or water ($H_2O$) by holding a mixture of the lower-molecular-weight products and an oxidant in the medium in a subcritical state thereof, an organic waste feeding means for feeding the organic wastes to the reactor, a medium feeding means for feeding the medium to the reactor, an oxidant feeding means for feeding an oxidant to the reactor, and a recovering means for recovering a fluid produced in the reactor.

A third waste processing apparatus of the present invention has a reactor for decomposing an organic substance contained in organic wastes in a medium in a supercritical state thereof, an organic waste feeding means for feeding the organic wastes to the reactor, a medium feeding means for feeding the medium to the reactor, an adjusting means for adjusting the hydrogen ion concentration in the reactor, and a recovering means for recovering a fluid produced in the reactor.

A fourth waste processing apparatus involving the present invention has a reactor decomposing all or almost all of an organic substance included in organic wastes into lower-molecular-weight products in a medium which is in a supercritical state thereof, subsequently, in the medium which is in a subcritical state thereof, oxidizing and decomposing the lower-molecular-weight products into carbon dioxide ($CO_2$) and/or water ($H_2O$) with an oxidant, an organic waste feeding means for feeding the organic wastes to the reactor, a medium feeding means for feeding the medium to the reactor, an oxidant feeding means for feeding an oxidant to the reactor, an adjusting means for adjusting the hydrogen ion concentration in the reactor, and a recovering means for recovering a fluid produced in the reactor.

A fifth waste processing apparatus of the present invention has a reactor decomposing all or almost all of an organic substance included in organic wastes into lower-molecular-weight products in a medium which is in a supercritical state thereof, an organic waste feeding means for feeding the organic wastes to the reactor, a medium feeding means for feeding the medium to the reactor, an oxidation reactor oxidizing and decomposing the lower-molecular-weight products into carbon dioxide ($CO_2$) and/or water ($H_2O$) with an oxidant in a medium which is in a subcritical state thereof, an oxidant feeding means for feeding an oxidant to the oxidation reactor, an adjusting means for adjusting the hydrogen ion concentration in the reactor, and a recovering means for recovering a fluid produced at the oxidation reactor.

A sixth waste processing apparatus of the present invention has a reactor decomposing an inorganic substance contained in inorganic wastes in a medium which is in a supercritical state thereof, an inorganic waste feeding means for feeding the inorganic wastes to the reactor, a medium feeding means for feeding the medium to the reactor, an adjusting means for adjusting the hydrogen ion concentration in the reactor, and a recovering means for recovering a fluid produced in the reactor.

The first, second, third, fourth, or fifth waste processing apparatus may be provided with a neutral-salt feeding apparatus adding a neutral salt to the medium to be supplied to the reactor.

The reactor may be provided with a means for radiating ultra-violet rays or radial rays to the content of the reactor.

The liquid processing means may be provided with a neutralizing means for neutralizing an acid contained in the liquid.

In the third, fourth, fifth, or sixth waste processing apparatus, the adjusting means can be constituted such that a medium is adjusted to a pre-determined hydrogen ion concentration by the addition of inorganic acid and provided to the reactor.

The adjusting means can be constituted to have an acid feeding means for feeding an inorganic acid to the reactor, a hydrogen ion concentration measuring means for measuring the hydrogen ion concentration in the reactor, and a controlling means for feeding a calculated amount of the inorganic acid from the acid feeding means to the reactor based on a signal from the hydrogen ion concentration measuring means.

As the inorganic acid, at least one of sulfuric acid and hydrochloric acid is desirable to be used. By providing an oxidant feeding means for feeding oxidant to the reactor, the adjusting means can be constituted such that the hydrogen ion concentration can be adjusted according to the types of the organic wastes or the inorganic wastes and the feeding amount of the oxidant. The diverse kinds of wastes can be thus processed with excellent efficiency.

The waste processing apparatus of the present invention, to the reactor, may be provided with a separating means for separating insoluble impurities contained in the organic wastes or the inorganic wastes.

It is preferable to provide a means for detecting a state of a medium in the reactor for correctly evaluating whether the medium in the reactor is in its supercritical state or not so as to process the wastes under the optimum conditions. For instance, if a means for measuring the temperature and the pressure in the reactor is disposed, the state of the medium can be detected. Instead of directly measuring the temperature and the pressure inside the reactor, the temperature and the pressure of a mixture of the medium and the wastes preceding supply to the reactor can be measured.

To the organic wastes or the inorganic waste feeding means, and to the medium feeding means, a pressurizing means for pressurizing respectively the organic wastes or the inorganic wastes, and the medium, and a pre-heating means for pre-heating respectively the organic wastes or the inorganic wastes, can be provided. To the recovering means, a pressure reducing means for decompressing the fluid produced at the reactor and a cooling means for cooling the same can be provided. When there are an acid feeding means or an oxidant feeding means, a pressurizing means for pressurizing the acid or the oxidant and a pre-heating means for pre-heating the same can be disposed. With such a constitution, since the wastes and the like can be continuously fed/recovered and processed, the processing efficiency can be enhanced.

One time or more, preferably 1.2 to 10 times, the stoichiometric value, necessary for completely oxidizing the organic wastes or the inorganic wastes, of oxygen, air, hydrogen peroxide, or mixtures thereof are preferably used as the oxidant.

A covering means for covering at least a part of the organic wastes or the inorganic waste feeding means can be preferably disposed. For instance, at least a part of the organic wastes or the inorganic wastes can be preferably disposed in a glove box or a hood.

The covering means is preferably explosion-resistant.

The recovering means is preferable to comprise a gas-liquid separating means, a gas processing means, and a liquid processing means.

The gas processing means is further preferable to comprise a filter removing a solid component, a radioactive material or a hazardous substance in the gas, and a scrubber recovering a radioactive material or a hazardous substance in the liquid.

Further, as a solution to be used in the scrubber, at least one of water, an alkaline solution containing sodium hydroxide, or water containing a reducing agent is preferably used.

The liquid processing means preferably comprises a means for sampling and analyzing the liquid.

The liquid processing means is desirable to have a means for stirring the liquid.

The liquid processing means preferably comprises a means for cooling the liquid.

The liquid processing means preferably comprises a means for aggregating and precipitating inorganic ions in the liquid.

The liquid processing means is preferable to have a means for collecting a solid component in the liquid.

The liquid processing means is preferable to have an ion-exchange means for removing an ionic component in the liquid.

The liquid processing means is preferable to have an extracting/recovering means for extracting/recovering inorganic ions in the liquid by allowing the liquid to be in contact with an extracting agent.

As the extracting agent, at least either one of a neutral organophosphorous compound or an acidic organophosphorous compound is preferably employed.

As a diluent of the extracting agent, carbon dioxide is desirable to be used.

The liquid processing means is desirable to comprise a drying means for drying liquid/sludge.

The liquid processing means is desirable to comprise a solidifying means for solidifying liquid/sludge.

The solidifying means is desirable to solidify in a container a mixture of a liquid, a sludge or a mixture thereof and a solidifying agent.

According to the present invention, when processing organic wastes or inorganic wastes by making use of a medium in its supercritical state, inorganic substance contained in the organic wastes or inorganic wastes can be effectively prevented from being precipitated. Therefore a huge volume of wastes can be effectively processed and the constructing expenditure of the equipment or the running cost can be drastically decreased.

DESCRIPTION OF THE PREFERRED EMBODIMENTS

Various other objects, advantages and features of the present invention will become apparent from the ensuing detailed description, and the novel features will be particularly pointed out in the appended claims.

In the following embodiments or description of embodiments, the same elements are given the same codes, thereby eliminated duplication of the description.

Embodiment 1

Figure 1:
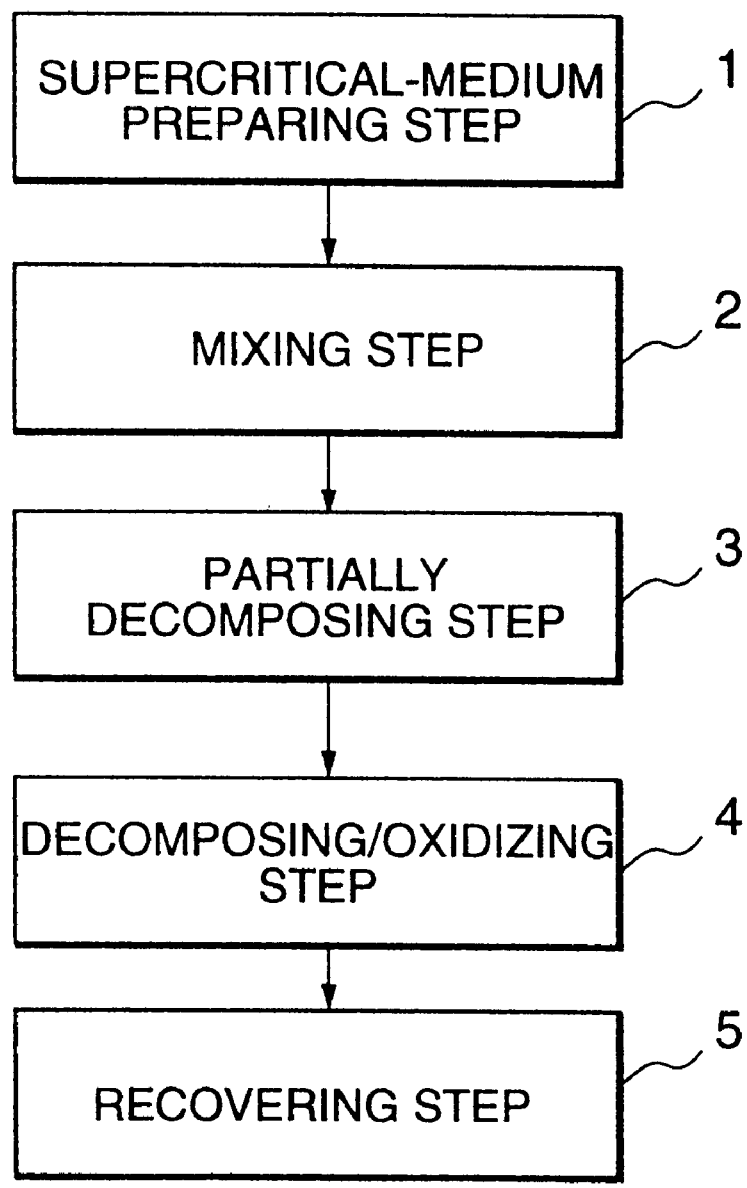
FIG. 1 is a flow diagram showing a waste processing method of Embodiment 1 of the present invention.
Figure 2:
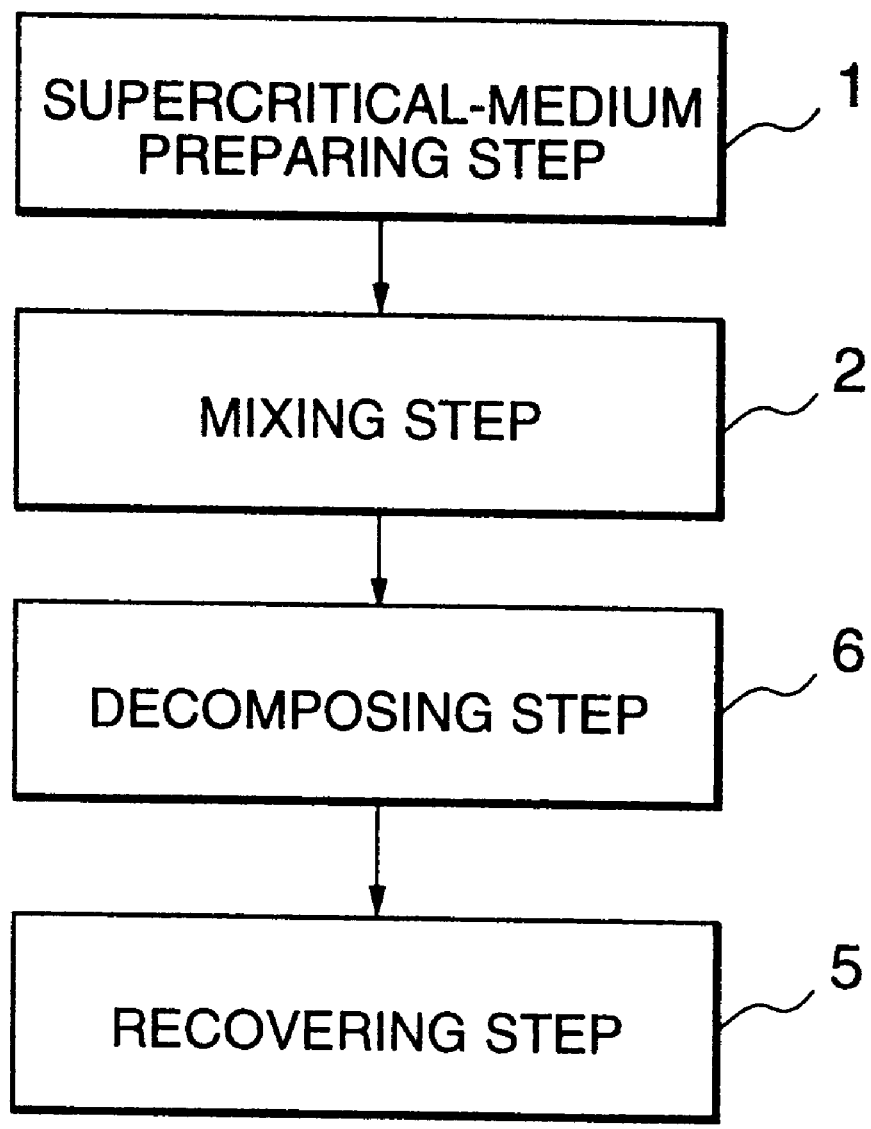
FIG. 2 is a flow diagram showing a conventional waste processing method.

FIG. 1 is a flow diagram showing a waste processing method of Embodiment 1 of the present invention. FIG. 2 is a flow diagram showing a conventional waste processing method.

As shown in FIG. 2, according to the conventional method, in a supercritical medium preparing step 1, water which is a medium is made supercritical. In a mixing step 2, to the water in its supercritical state, organic wastes including sulfate are added. The thus-obtained mixture, in a decomposition step 6, is held together with an oxidant for a predetermined time period under high temperature and high pressure conditions exceeding the critical point of the water. The organic wastes including sulfate is oxidized and decomposed in the supercritical water.

The thus-produced decomposition gas and decomposition liquid and inorganic substances such as sulfate included in the organic wastes are transferred to a recovering step 5 and undergo, for example, solidification processing after the recovery of a hazardous material.

According to the method of Embodiment 1, in the supercritical medium preparing step 1, the water, as a medium, is heated and pressurized to a supercritical state. In the mixing step 2, an organic wastes including sulfate is added to the thus-obtained supercritical water.

Incidentally, instead of mixing the supercritical medium with organic wastes, the medium can be made supercritical by heating and pressurizing after mixing the medium and the organic wastes.

In a partially decomposing step 3, the thus-obtained mixture is held in the supercritical water, not containing an oxidant, for a predetermined time period, thereby all or almost all of the organic materials included in the organic wastes containing sulfate is decomposed into lower-molecular-weight products.

Then, in a decomposing/oxidizing step 4, the lower-molecular-weight products produced in the step 3 is mixed with an oxidant and is maintained under a subcritical state for a predetermined time period.

The thus-produced decomposition gas and decomposition liquid and the inorganic material (ions) such as the sulfate included in the organic wastes are transferred to the recovering step 5 and undergo, for example, solidification processing after the recovery of the hazardous materials.

In the conventional method, the organic materials included in the organic wastes can be effectively decomposed through oxidation, however, when inorganic materials are included in the organic wastes, the inorganic materials more readily form oxides and precipitate in the supercritical state as compared with the subcritical state.

Figure 3:
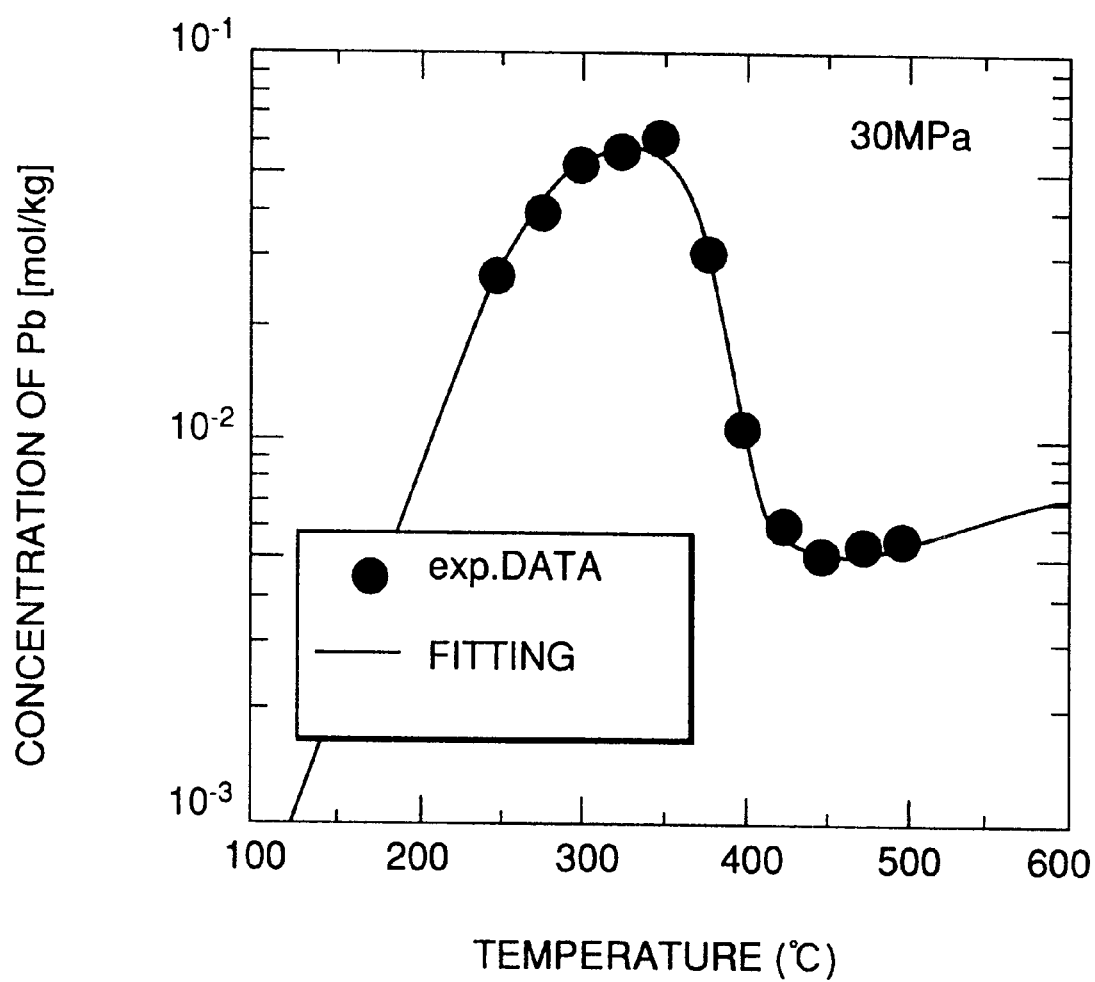
FIG. 3 is a graph showing solubility of lead oxide in supercritical and subcritical states.

Description will be made with lead as an example. FIG. 3 is a graph showing solubility of lead oxide under supercritical and subcritical conditions (Chemical Engineering Society 63rd Annual Meeting, Tohoku University, Engineering Faculty, Sue et al. "Solubility measurement of metal oxides in subcritical, supercritical water"). The solubility of lead oxide in a supercritical region of 374° C. or more is low, for example, the solubility is $0.5 \times 10^{-3}$ mol/kg at 450° C. However, in a subcritical region, the solubility rises to $0.5 \times 10^{-2}$ mol/kg, about 10 times that of the supercritical region. The solubility tends to decrease when oxygen coexists.

Therefore, when organic wastes including inorganic additive or an organo-metallic salt additive is processed under a supercritical state in the presence of an oxidant as identical as the conventional case, the inorganic materials included in the inorganic additive or the organo-metallic salt additive precipitate as oxides.

In this embodiment, since an oxidant does not exist in the partially decomposing step 3, the inorganic materials such as sulfate included in the organic wastes are not oxidized, therefore, the inorganic oxides are prevented from being precipitated.

Thereafter, the organic materials can be effectively oxidized and decomposed through addition of an oxidant in a subcritical state (step 4).

When the organic materials are allowed to react in the supercritical water before being oxidized by adding an oxidant, bonding having small bonding energy is selectively pyrolysed or hydrolysed in the organic materials so that the organic materials of high molecular weight are decomposed into lower-molecular-weight products. Then, in a subcritical state, an oxidant is added to the organic materials which have been rendered lower-molecular-weight products. In such a case, the organic materials react rapidly with oxygen because of their lower-molecular weight, thereby largely reducing the time period required for oxidation.

Therefore, by maintaining organic wastes in a subcritical state for a predetermined time period after maintaining the organic wastes in a supercritical state for a predetermined time period, the organic wastes can be effectively decomposed and oxidized while preventing the precipitation of the inorganic materials.

Although hydrogen peroxide is used as an oxidant in Embodiment 1, other materials can be used instead. Oxygen, air, ozone, or mixtures thereof.

The organic materials in general are decomposed when they react with radicals. The hydroxy-radical (–OH hereinafter referred to as the OH radical) is particularly active to the organic materials. The OH radical has oxidation-reduction potential as shown in Equation I in an acidic solution of 25° C. and is used as an oxidant stronger than ozone.

$$OH \bullet + H^+ + e^- \rightarrow H_2O \quad 2.85V.\ vs.\ NHE \qquad (I)$$

Therefore, in order to effectively decompose organic materials, generation of the OH radical becomes an important key.

When water in a supercritical state thereof and oxygen react, as shown in Equation II, the OH radical and the hydroperoxy radical (•OOH) are generated.

$$H_2O + O_2 \rightarrow HO_2 \bullet + OH \bullet \qquad (II)$$

According to the report of Baulch et al., a reaction rate constant of Equation II at 500° C. is as low as $10^{-10.5}$ mol/s (oxygen: 0.00631 mol, water: 6.31 mol). Furthermore, the hydroperoxy radical reacts as shown in Equation III to generate hydrogen peroxide and oxygen, and the resultant hydrogen peroxide is further decomposed to generate the OH radical as shown in Equation IV.

$$HO_2 \bullet + HO_2 \bullet \rightarrow H_2O_2 + O_2 \qquad (III)$$

$$H_2O_2 \rightarrow 2OH \bullet \qquad (IV)$$

In general, the reaction between the radicals themselves are rapid, the decomposition reaction of the hydrogen peroxide occurs easily at a temperature of 100° C. or more. Thus the reaction rate of Equations III and IV are considered to be rapid.

When an organic substance is decomposed in the presence of oxygen in the supercritical water, the reaction of Equation II becomes a rate-determining step. Therefore, if the OH radical is directly generated through addition of hydrogen peroxide, the decomposition reaction of the organic substance can occur effectively.

In the following, polyethylene was decomposed according to the method of Embodiment 1.

To a reactor (5.6 ml), 10 mg of polyethylene to which 2 mg-Ce of cerium sulfate was stuck and 2 ml of water were added and allowed to react at a temperature of 400° C., a pressure of 30 MPa for 30 min.

After returning the system to room temperature and atmospheric pressure, 99% or more of the polyethylene, initially existed as a solid, was pyrolysed to alkanes and alkenes (c=1 to 30) and existed in the gas or liquid phase.

To the resultant, 0.3 g of hydrogen peroxide and 1.6 g of water (to become 3.6 g in total) were added, and kept at a temperature of 350° C., a pressure of 30 MPa for 30 min. After reaction, the system was returned to room temperature and atmospheric pressure, and then, organic carbon contents in the gas phase and the liquid phase were measured, revealing that 99% or more of the organic materials was oxidized and decomposed to $CO_2$ and $H_2O$.

The decomposition liquid was filtered and the cerium content in the filtrate was measured by ICP (Inductively Coupled Plasma Spectroscopy). Furthermore, after dissolution of the filter in an acid, the cerium content was measured using ICP in the identical manner as the above, no precipitate was found. Therefore, all the cerium was found to exist in the form of ion and not to be precipitated as oxide.

For comparison, polyethylene was decomposed in the presence of an oxidant in the supercritical water as conventionally.

10 mg of polyethylene to which 2 mg-Ce of cerium sulfate was stuck, 2 ml of water, and 0.3 g of hydrogen peroxide were added to a reactor (5.6 ml), and the resulting mixture was allowed to react at a temperature of 400° C., under a pressure of 30 MPa, for 30 min.

As the result, 99% or more of the polyethylene was oxidized and decomposed to carbon dioxide and water. The half of cerium precipitated as oxide.

From the above, according to the method of Embodiment 1, without precipitating the inorganic materials, the organic wastes was found to be decomposed effectively.

Embodiment 2

According to the method of Embodiment 2, in the conventional supercritical-medium preparing step 1 shown in FIG. 2, water to which an inorganic acid is added to adjust the hydrogen ion concentration to $10^{-4}$ mol/kg or more is made supercritical and is used as a supercritical medium in the later step.

According to Smith et al., a metallic element in a nitric acid waste liquid is hydrolysed under a high temperature and a high pressure as shown in Equation V, thereafter, is pyrolysed as shown in Equation VI to be converted to oxide finally.

Since the nitric acid produced according to Equation V is pyrolysed to generate NOx gas and oxygen, oxide is readily formed.

$$M(NO_3)_n + nH_2O \rightarrow M(OH)_n + nHNO_3 \quad (V)$$

$$M(OH)_n \rightarrow MO_m \quad (VI)$$

In order to prevent such hydrolysis, the equilibrium of Equation V is required to be shifted to the left side through addition of an acid.

Figure 4:
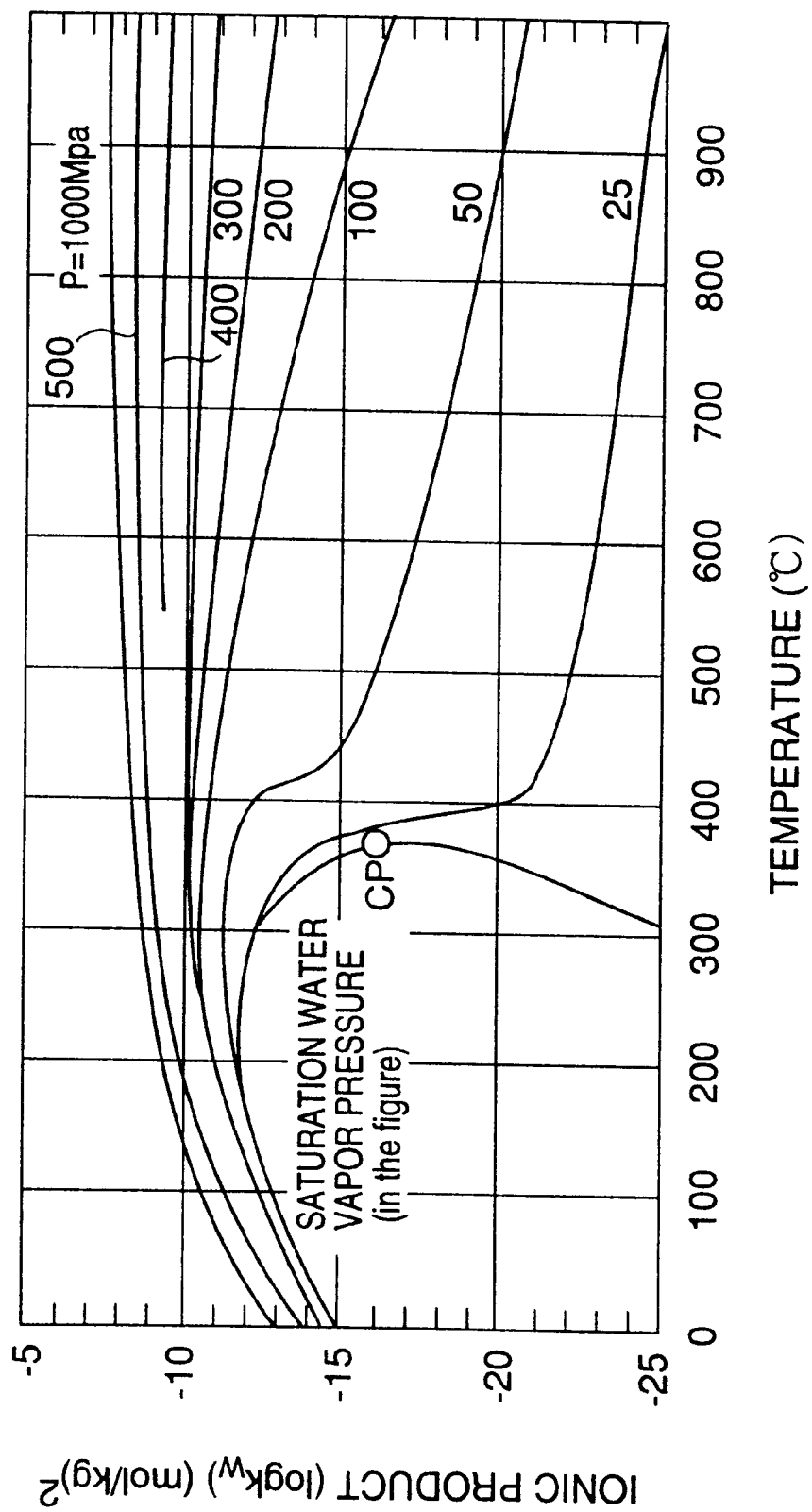
FIG. 4 is a graph showing the changes in the ionic product of water when temperature and pressure are varied.

The hydrogen ion concentration of water possesses an intimate relation with the ionic product of water. In FIG. 4, the ionic product of water is shown with a temperature and a pressure as variables.

For instance, at a pressure of 25 MPa, the ionic product of water becomes the largest value of $10^{-11}(mol/kg)^2$ at around 300° C. Therefore, the hydrogen ion concentration of the supercritical water, without coexistence of acid and the like, becomes $3.3 \times 10^{-6}$ mol/kg. Further, under conditions of the supercritical water of 374° C. or more, the ionic product of water becomes smaller than $10^{-11}(mol/kg)^2$, particularly at 600° C., becomes $10^{-24}(mol/kg)^2$. Therefore, the hydrogen ion concentration at 600° C. becomes an extremely small value of $10^{-12}$ mol/kg as compared with the hydrogen ion concentration at 300° C.

In the conventional case of decomposing the organic materials with the supercritical water, conditions of a high temperature and a relatively low pressure (for instance, 600° C., 25 MPa) are preferred. Therefore, when organic materials including inorganic materials are allowed to react with only water at a high temperature, the hydrogen ion concentration in the reactor becomes extremely small, the equilibrium of Equation V is shifted towards the right side, resulting in precipitation of the inorganic materials as oxides.

In order to increase the ion concentration in the supercritical water, the ionic product is required to increase. As shown in FIG. 4, the ionic product tends to increase as the pressure increases, however, the actual applicable pressure is considered to be 50 MPa or less.

For instance, at 350° C. and 50 MPa, the ionic product becomes $10^{-12}(mol/kg)^2$, 100 times larger compared with the ionic product at room temperature and atmospheric pressure $(10^{-14}(mol/kg)^2)$. However, the hydrogen ion concentration is at a level of $10^{-6}$ mol/kg. It is thus impossible to largely increase the hydrogen ion concentration in the supercritical water by the selection of the temperature and the pressure. Therefore, in this embodiment, the hydrogen ion concentration is adjusted by the addition of an acid to the supercritical water so as to prevent precipitation of oxides.

By the method of this embodiment, conditions preventing precipitation of the oxide through the addition of an acid to the supercritical water were investigated.

In order to adjust the hydrogen ion concentration of water to $10^{-4}$ mol/kg, sulfuric acid of $5 \times 10^{-5}$ mol/kg was added to the water.

The thus-obtained medium and cerium nitrate (1 mg as cerium) were mixed and allowed to react at 400° C., 25 MPa for 30 min. After reaction, the system was returned to room temperature and atmospheric pressure, and then, the decomposition liquid was filtered. The cerium content in the filtrate was measured by ICP. Furthermore, the filter paper was dissolved in an acid and the cerium content was similarly measured by ICP so as to evaluate the existence of the precipitate. The results are shown in Table 1.

In addition, as conventional examples, the result obtained by using only water not containing sulfuric acid as a medium and the result obtained by using a medium mixed with $5 \times 10^{-6}$ mol of sulfuric acid, namely $5 \times 10^{-5}$ mol as the hydrogen ion concentration, per 1 kg of water are concurrently shown.

As obvious from Table 1, contrary to the conventional examples where 100% of cerium precipitated as cerium oxide, the precipitation rate becomes 0% and all of the cerium remained in the liquid phase in a dissolved state when $5 \times 10^{-5}$ mol of sulfuric acid was added. When $5 \times 10^{-6}$ mol of sulfuric acid is added, 70% of the cerium precipitated.

From the above, it is recognized that, if the acid was added to adjust the hydrogen ion concentration to $10^{-4}$ mol/kg, cerium does not precipitate.

TABLE 1

| Added sulfuric acid amount/1 kg of water | 0 mol | $5 \times 10^{-6}$ mol | $5 \times 10^{-5}$ mol |
|---|---|---|---|
| Precipitation rate of cerium | 100% | 70% | |
| Note | Conventional example | | Present invention |

An inorganic material is oxidized to oxide when oxygen exists. In the method of this embodiment, conditions where an organic material can be decomposed without precipitating inorganic material even if the medium contains an oxidant was investigated.

Figure 5:
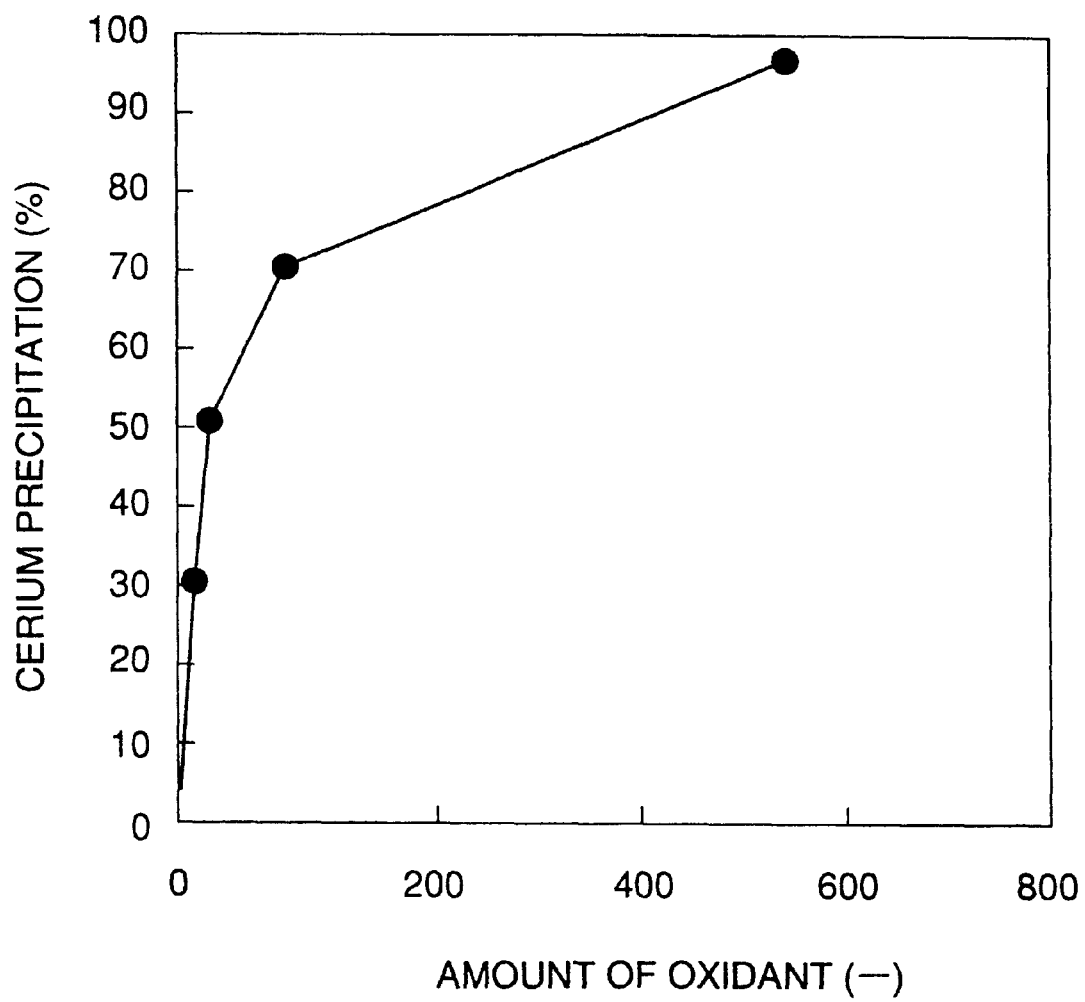
FIG. 5 is a graph showing the precipitation (%) of cerium when the amount of oxidant is varied.

FIG. 5 shows results where water, sulfuric acid, and an oxidant were added to cerium nitrate (1 mg as cerium), followed by reaction at 400° C. and 30 MPa for 30 min. Ordinate indicates the percentage of precipitated cerium and abscissa indicates the added amount of oxidant shown by the multiple of the stoichiometric value.

$5 \times 10^{-3}$ mol of sulfuric acid was added to 1 kg of water. When being measured by ICP, the percentage of cerium precipitation increased as the oxidant addition increased. In particular, when the oxidant was added as much as 600 times (0.3 g of hydrogen peroxide) the stoichiometric value (postulated that cerium converts to cerium dioxide), 97% of the cerium precipitated.

Therefore, when an oxidant exists, the amount of the acid added is required to increase as the amount of the oxidant increases.

In Table 2 results are shown which are obtained by adding as much as 4 times the stoichiometric value of the oxidant to cerium nitrate (1 mg as cerium) and by allowing the resulting mixture to react at 400° C., 30 MPa for 30 min. When sulfuric acid of $5 \times 10^{-2}$ mol/kg was added to water, the precipitation rate of the cerium was 0%.

Therefore, it is recognized that, in the presence of an oxidant, $5\times10^{-2}$ mol of sulfuric acid (as the hydrogen ion concentration; $10^{-1}$ mol) is needed to be added to 1 kg of water.

TABLE 2

| Sulfuric acid addition to 1 kg of water | $5 \times 10^{-4}$ mol | $5 \times 10^{-3}$ mol | $5 \times 10^{-2}$ mol |
|---|---|---|---|
| Cerium precipitation rate | 98% | 70% | 0% |

From the above, it is understood that even when an oxidant exists, an organic material can be decomposed without precipitating inorganic materials if an acid is added to have the hydrogen ion concentration to $10^{-1}$ mol per 1 kg of the medium.

Further, in the method of this embodiment, cases where salts of inorganic materials other than nitrate were included in the organic wastes were studied.

To each of nitrate, sulfate, chloride, phosphate and oxide of cerium (1 mg as cerium), an oxidant of 4 times the stoichiometric value was added to prepare the respective samples. Water containing $5\times10^{-2}$ mol/kg of sulfuric acid was used as the medium. Each mixture of the medium and the sample was reacted at 400° C., 30 MPa for 30 min.

The results are shown in Table 3.

In each case of nitrate, sulfate, chloride and phosphate, when being measured by ICP, the cerium amount existing as ions in water was 100%, the precipitation rate of cerium became 0%. Furthermore, 50% of the oxide originally existed as a solid was dissolved in the liquid, which fact means that even oxide can be recovered in the liquid phase if the amount of the oxide is small.

TABLE 3

| Form of cerium | Nitrate | Sulfate | Chloride | Phosphate | Oxide |
|---|---|---|---|---|---|
| Cerium amount in water | 100% | 100% | 100% | 100% | 50% |

From the above, according to this embodiment, not only when nitrate is included but also when sulfate, chloride, phosphate or oxide is included, the organic material is found to decompose without precipitating the inorganic material.

For instance, when processing organic wastes including an oxide of plutonium by the method of this embodiment, the organic wastes (for instance, cloth, gloves, etc.) contaminated with plutonium can be rendered non-alpha-bearing wastes (i.e., the wastes including only elements which do not emit alpha-rays), since the plutonium can be recovered as ions in the liquid. The processing cost can be thus reduced.

Further, in the method of this embodiment, whether organic wastes can be processed or not without precipitating inorganic materials is studied by employing sulfuric acid and hydrochloric acid as the inorganic acid for adjusting the hydrogen ion concentration of the medium.

As media, $5\times10^{-2}$ mol of sulfuric acid, $1\times10^{-1}$ mol of hydrochloric acid, and $1\times10^{-1}$ mol of nitric acid were respectively added to 1 kg of water. Cerium nitrate (1 mg as cerium) and an oxidant of 4 times the stoichiometric value were added to each medium, followed by reaction at 400° C., 30 MPa for 30 min. The results are shown in Table 4.

When being measured by ICP, cerium did not precipitate in the medium containing sulfuric acid and the medium containing hydrochloric acid, however, 100% of cerium was precipitated in the medium containing nitric acid. It is considered that, because of pyrolysis at a high temperature in the case of nitric acid, the hydrogen ion concentration became $10^{-4}$ mol or less to 1 kg of water, the solubility of the inorganic material decreased, resulting in the precipitation of cerium.

From the above, it is understood that when sulfuric acid or hydrochloric acid is used as an inorganic acid, organic wastes are decomposed without precipitating inorganic materials.

TABLE 4

| acid | Sulfuric acid | Hydrochloric acid | Nitric acid |
|---|---|---|---|
| Cerium precipitation rate | 0% | 0% | 100% |

Embodiment 3

Figure 6:
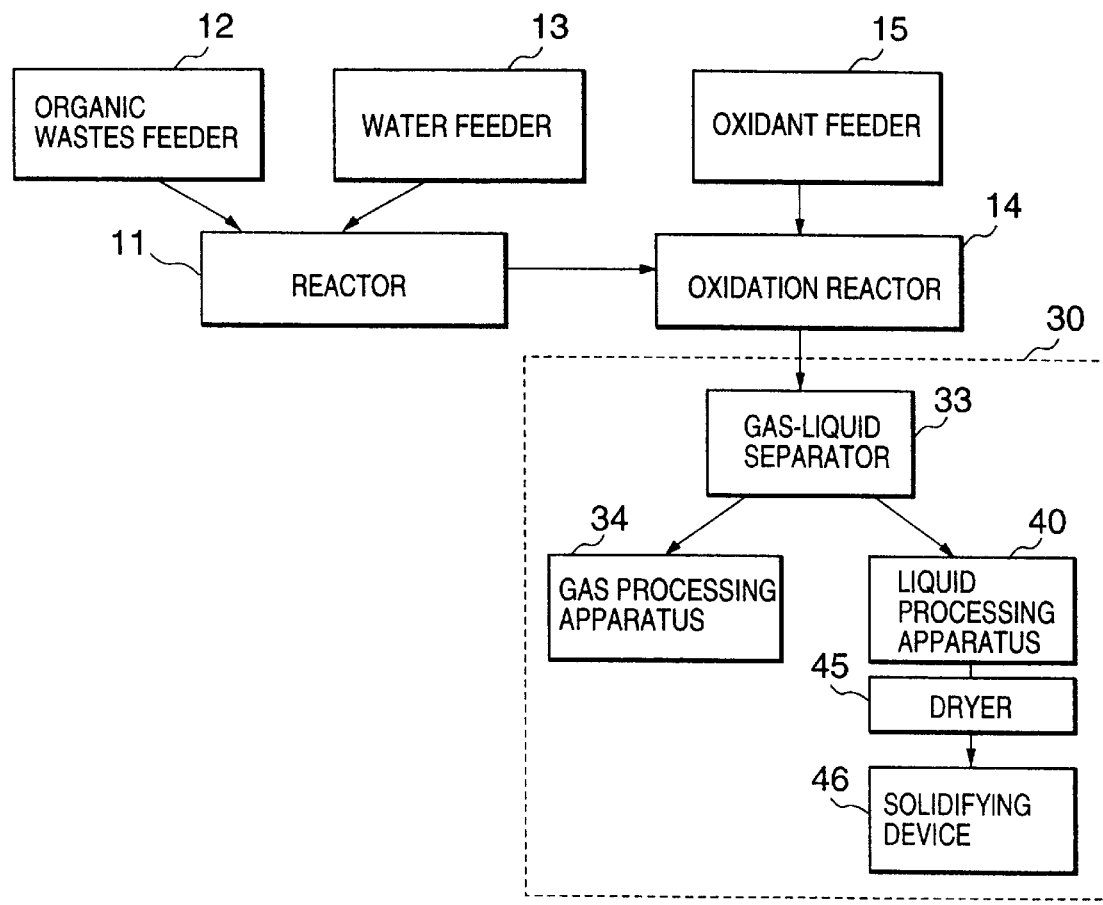
FIG. 6 is a schematic diagram showing a waste processing apparatus of Embodiment 3.

FIG. 6 is a schematic diagram showing a waste processing apparatus of this embodiment.

A waste processing apparatus of this embodiment has a reactor 11 processing organic wastes in supercritical water, an organic waste feeder 12 feeding the organic wastes into the reactor 11, a water feeder 13 feeding water which is a medium to the reactor 11, an oxidation reactor 14 oxidizing and decomposing the lower-molecular-weight organic products generated in the reactor 11, an oxidant feeder 15 feeding an oxidant to the oxidation reactor 14, and a recovering apparatus 30 recovering the products from the oxidation reactor 14.

The recovering apparatus 30 has a gas-liquid separator 33, a gas processing apparatus 34, and a liquid processing apparatus 40.

The liquid processing apparatus 40 has a dryer 45 drying a liquid/sludge and a solidifying device 46 solidifying the liquid/sludge.

In this embodiment, the reactor 11 and the oxidation reactor 14 are disposed separately and connected each other by a pipe or the like so that the products produced in the reactor 11 are transferred to the oxidation reactor 14. However, the reactor 11 and the oxidation reactor 14 may be constituted to be one vessel separated by a baffle into two rooms. Further, if the pressure and the temperature can be appropriately adjusted, one vessel can be used as the reactor 11 and the oxidation reactor 14.

The wastes being processed are not particularly restricted to a certain type. Various organic wastes those which include a resin and the like and those which are contaminated with a radioactive material and the like can be processed by this apparatus.

When organic wastes including insoluble impurities such as sand, pebble, or organic wastes such as a resin including an inorganic additive or an organo-metallic additive are processed, in some cases, precipitation of the inorganic materials can not be prevented, even when the organic substances in the wastes are decomposed into lower molecular weight substances in a supercritical state and then further decomposed and oxidized in a subcritical state.

Figure 7:
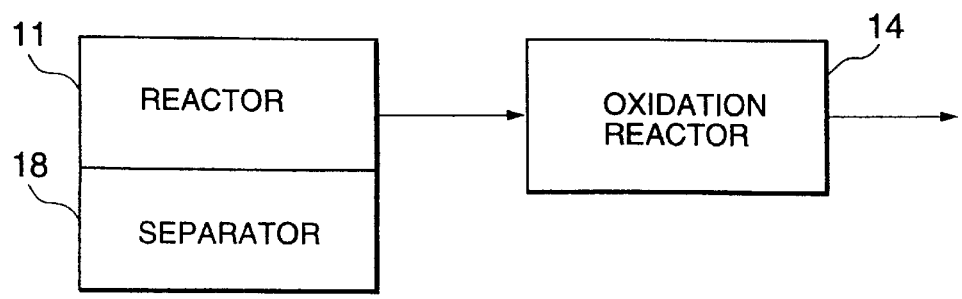
FIG. 7 is a schematic diagram showing a separator disposed at the lower part of a reactor.

In such a case, it is preferable to reduce the amount of the organic wastes to be processed at a time. Furthermore, by disposing a separator 18 at the lower portion of the reactor 11 as is shown in FIG. 7, the inorganic materials precipitated in the supercritical state can be removed by making use of the gravity or the inertia. Thereby, precipitation of the inorganic materials is prevented in the subcritical state.

The separator 18 shown in FIG. 7 can be disposed in the inside of the reactor 11 or disposed between the reactor 11 and the oxidation reactor 14.

In this embodiment, water is used as the supercritical medium, however, other media, such as carbon dioxide, various kinds of hydrocarbons, or mixtures thereof may be employed.

Figure 8:
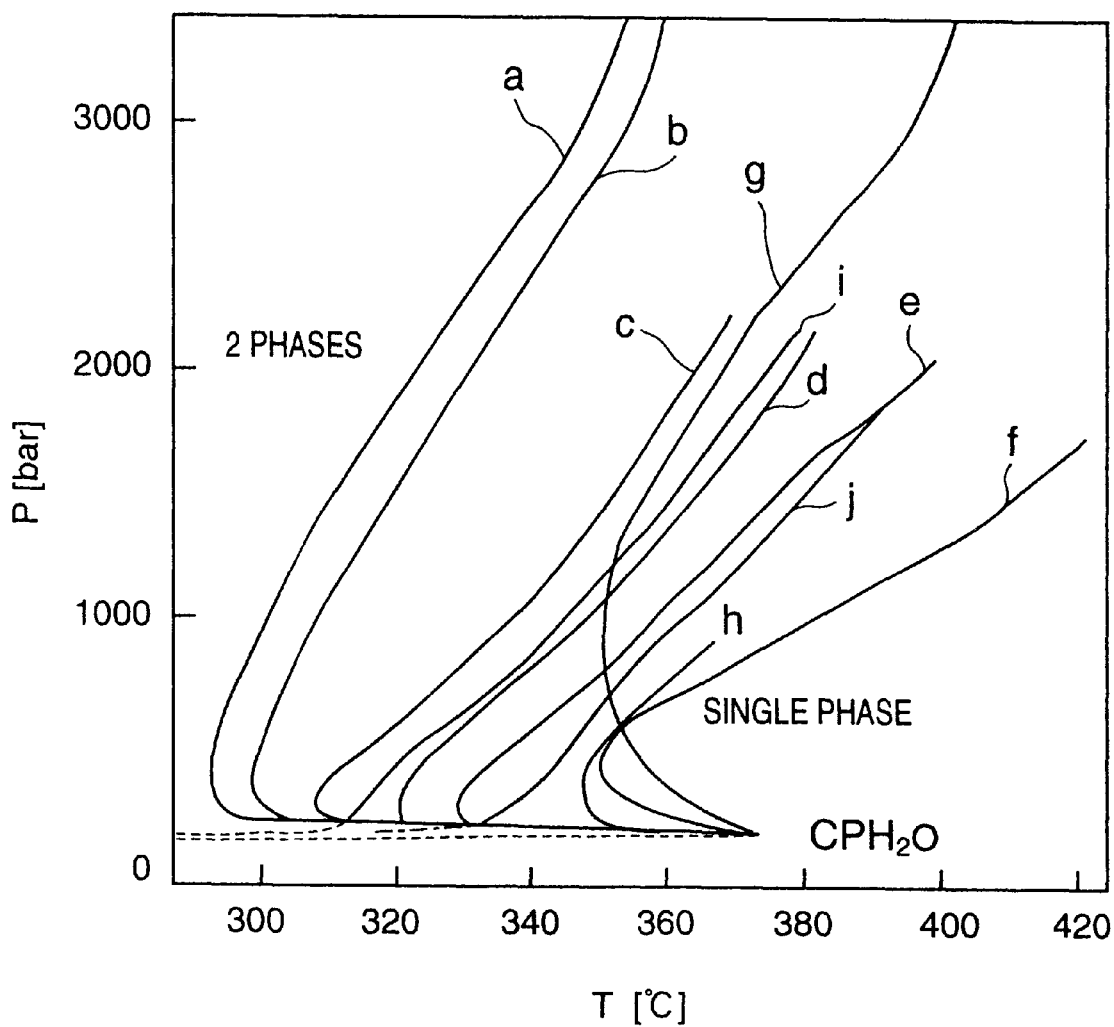
FIG. 8 is a graph showing the critical curves of mixtures of water and hydrocarbons.

FIG. 8 is a graph showing the critical curves of mixtures of water and hydrocarbons. In the figure, the critical curves of water-benzene (a), benzene-heavy water (b), water-toluene (c), water-o-xylene (d), water-1,2,5-trimethylbenzene (e), water-cyclobenzene (f), water-ethane (g), water-n-butane (h), water-naphthalene (h), and water-biphenyl (i) are shown. The critical point of water is 374° C., 22 MPa, however, for instance, in the water-benzene system in FIG. 8, the critical point can be decreased to 300° C. or less by mixing two components in a specific proportion. Therefore, if a mixture of any two or more of water, carbon dioxide and hydrocarbons is used as a medium, the organic wastes can be processed at milder conditions of a lower temperature and a lower pressure while maintaining a supercritical state.

Though hydrogen peroxide is used as the oxidant in this embodiment, other oxidants can be used, for example, oxygen, air, ozone, or mixtures thereof can be employed.

Hydrogen peroxide is preferably used because organic material can be effectively decomposed by employing hydrogen peroxide as an oxidant.

Further, in order to decompose the organic material completely, the hydrogen peroxide amount added is preferably at least the amount that is required for converting the organic wastes to carbon dioxide and/or water, and more preferably, 1.2 to 10 times the amount.

In the case actually processing organic wastes with this apparatus, from the water feeder 13, water as the medium is supplied to the reactor 11. To the reactor 11 in which water have been made supercritical, the organic wastes is fed by the organic wastes feeder 12, mixed with the supercritical water, and maintained in a supercritical state for a predetermined period.

The organic wastes in the reactor 11 is decomposed into lower-molecular-weight products in the supercritical water. The lower-molecular-weight products are transferred to the oxidation reactor 14, mixed with the oxidant and maintained in a subcritical state so that the products are oxidized and decomposed into carbon dioxide and water.

The fluid generated in the oxidation reactor 14 is transferred to the recovering apparatus 30, separated into the gas phase and the liquid phase at the gas-liquid separator 33, and the resulting gas and liquid are transferred to the gas processing apparatus 34 and the liquid processing apparatus 40 respectively to recover hazardous materials.

The solid/liquid phase produced due to decomposition, after being dried at the dryer 45, is mixed with a solidifying agent in a solidifying device 46, solidified in a processing container such as a drum to form a stable solidified body. Thereby, safeness can be secured during storage and disposal, in addition, management is made easy. As the solidifying agent, for instance, cement milk is preferably used.

Through disposition of the organic wastes feeder 12, the water feeder 13, and the oxidant feeder 15, the organic wastes, water, and the oxidant can be continuously fed to the reactor 11, and, with the recovering device 30, the processed products can be continuously taken out. Therefore, the organic wastes can be continuously processed.

As described above, according to the waste processing apparatus of this embodiment, when processing the organic wastes by making use of a supercritical state, the inorganic materials which has been conventionally problematic can be prevented from being precipitated.

Therefore, troubles such as plugging of the reactor due to precipitation of inorganic materials can be evaded, running cost and maintenance cost of the apparatus can be thereby reduced. Furthermore, when the inorganic material contains a radioactive material, an effect of reducing exposure to the operators can be expected.

In addition, by adding hydrogen peroxide as an oxidant, the OH radical can be generated in a short time period, thereby, a huge amount of organic substances can be decomposed in a short time period.

Since inorganic salts can be recovered in an ionic form without forming oxide and the inorganic substance existing in an oxide from the beginning can be recovered to some extent in the liquid phase, the organic wastes can be rendered homogeneous and uniform.

Embodiment 4

Figure 9:
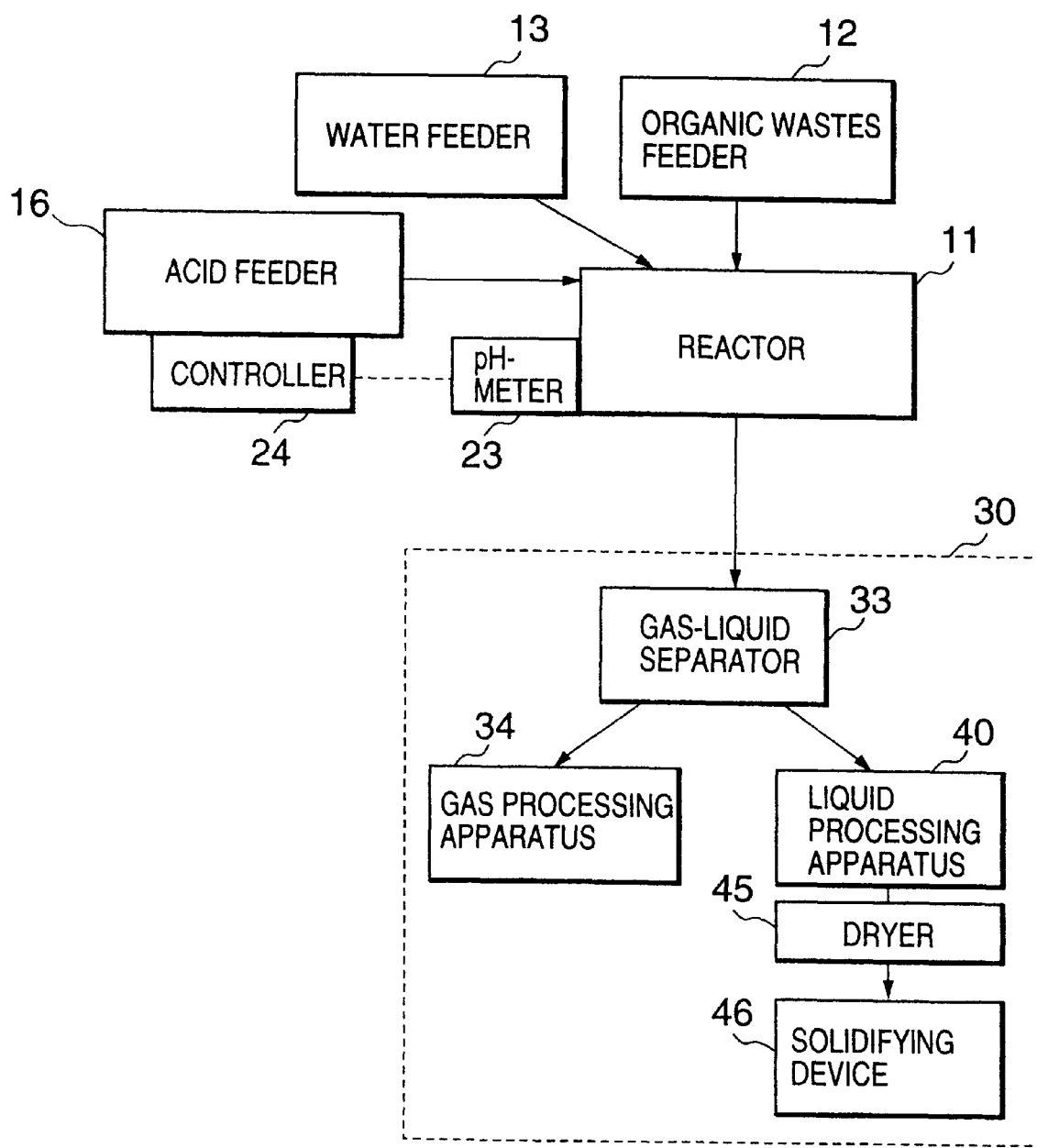
FIG. 9 is a schematic diagram showing a waste processing apparatus of Embodiment 4.

FIG. 9 is a schematic diagram showing a waste processing apparatus of this embodiment.

A waste processing apparatus of Embodiment 4 has a reactor 11 processing organic wastes in supercritical water, an organic wastes feeder 12 feeding the organic wastes into the reactor 11, a water feeder 13 feeding water which is a medium to the reactor 11, a pH meter 23 measuring the hydrogen ion concentration in the water in the reactor 11, an acid feeder 16 feeding an acid to the reactor 11, a controller 24 feeding a calculated amount of acid to the reactor 11 by controlling the acid feeder 16 based on the value measured by the pH meter 23, and a recovering apparatus 30 recovering products from the reactor 11.

The recovering apparatus 30 has a gas-liquid separator 33, a gas processing apparatus 34, and a liquid processing apparatus 40.

The liquid processing apparatus 40 has a dryer 45 drying a liquid/sludge and a solidifying device 46 solidifying the liquid/sludge.

As an acid to be supplied from the acid feeder 16, an inorganic acid which is ionized in water (medium) is employed. However, an acid which is decomposed at a high temperature, such as nitric acid, is not adequately used. Sulfuric acid and hydrochloric acid are preferably employed.

As mentioned in Embodiment 2, when the organic wastes are decomposed, if the hydrogen ion concentration of water is adjusted to $10^{-4}$ mol/kg or more, the inorganic substance can be prevented from being precipitated in the supercritical water.

However, depending on the types of the organic wastes, it is necessary to take into consideration that the hydrogen ion concentration of water may be affected by the decomposition product.

When a plastic container consisting of polyethylene and that consisting of polyvinyl chloride are maintained in the presence of water at a temperature of 374° C. or more and a pressure of 22.1 MPa or more, the polyethylene is hydrolysed to produce alcohol or organic acid, while the polyvinyl chloride produces hydrochloric acid other than alcohol or organic acid. Since the chlorine content in the polyvinyl chloride is 56% by weight, if 0.006 g of polyvinyl chloride is added to 1 kg of water, the hydrogen ion concentration in the reactor becomes $10^{-4}$ mol/kg.

Therefore, when 0.006 g or more of polyvinyl chloride is added to 1 kg of water, the acid addition is not required. However, since the polyethylene does not produce acid, the acid addition is required to materialize $10^{-4}$ mol/kg of the hydrogen ion concentration when processing polyethylene.

Further, when wastes including polyethylene which does not produce acid and polyvinyl chloride which produces acid are decomposed, it is necessary to estimate, through study of the mixing ratio, the acid amount to be produced from the organic substances.

In this embodiment, the hydrogen ion concentration in the reactor 11 is directly measured by the pH meter 23. Based on the measured value, the controller 24 calculates the amount of acid needed to adjust the hydrogen ion concentration to $10^{-4}$ mol per 1 kg of water, and controls the acid feeder 26 to feed the calculated amount of acid to the reactor 11.

With such a system, irrespective of the types of the organic wastes, the hydrogen ion concentration in the reactor can be maintained at the optimum state.

Further, by feeding the optimum amount of acid according to the types of the wastes being processed, the amount of acid supplied can be remarkably reduced.

Moreover, from the following reasons, a more compact gas-liquid separator 33 than the conventional example can be used.

Carbon dioxide is dissolved in water and forms a carbonic acid as shown in Equation VII. In water, carbonic acid is dissociated into ions as shown in Equations VIII and IX.

$$CO_2 + H_2O \rightarrow H_2CO_3 \quad \text{(VII)}$$

$$H_2CO_3 \rightarrow H^+ + HCO_3^- \quad \text{(VIII)}$$

$$HCO_3^- \rightarrow H^+ + CO_3^{2-} \quad \text{(IX)}$$

In order to shift the equilibrium of Equations VII, VIII, and IX toward the left sides of Equations so as to separate carbon dioxide from water, the hydrogen ion concentration in the aqueous solution is required to be increased. The acid dissociation constant of Equation VIII is reported to be $10^{-3.6}$ (mol/l) at 20° C. The $[HCO_3^-]/[H_2CO_3]$ ratios are shown for various hydrogen ion concentrations in Table 5.

Since $H_2CO_3$ is in equilibrium with carbon dioxide in the gas phase, separation of carbon dioxide from water becomes difficult when the ratio of $HCO_3^-$ dissolving in the liquid phase to $H_2CO_3$ is larger than 1. In the conventional method, the proportion of $H_2CO_3$ in the liquid is low because the hydrogen ion concentration of the liquid is about $10^{-7}$ mol/kg. Thus, in order to separate water and carbon dioxide, a large amount of air was required to be in contact with the mixture of water and carbon oxide, accordingly a relatively large gas-liquid separator is needed.

However, in the present invention, since the hydrogen ion concentration is being increased to $10^{-4}$ mol/kg or more, a gas-liquid separator more compact than the conventional one can be used, thereby reducing the equipment cost. Further, the processing volume in the gas processing line can be reduced because the air addition is not required. Thus the equipment cost and the running cost can be reduced.

TABLE 5

| Hydrogen ion concentration (mmol/l) | $[HCO_3^-]/[H_2CO_3]$ ratio |
|---|---|
| $10^{-1}$ | 0.0025 |
| $10^{-2}$ | 0.025 |
| $10^{-3}$ | 0.25 |
| $10^{-4}$ | 2.5 |
| $10^{-7}$ (conventional example) | 2500 |

Although the hydrogen ion concentration in the reactor 11 is directly measured by the pH-meter 23 in this embodiment, disposition of the pH-meter can be difficult in some cases because the inside of the reactor is under a high temperature and a high pressure.

In such a case, after calculating the required amount of acid based on the type and the volume of the waste to be processed, a mixture of water and the calculated amount of acid may be fed to the reactor 11. The hydrogen ion concentration can be thereby controlled without directly measuring the hydrogen ion concentration of the medium in the reactor and disposition of the pH-meter is not required.

As mentioned above, in the organic wastes processing apparatus of this embodiment, by adjusting the feeding amount of the inorganic acid according to the types of the organic wastes, the hydrogen ion concentration is controlled to the optimum state for preventing the inorganic material from being precipitated. Thus even if the wastes includes various types of organic materials, the processing can be easily carried out.

Further, by adjusting the amount of the inorganic acid in water to $10^{-4}$ mol or more to 1 kg of water in terms of the hydrogen ion concentration, the precipitation of inorganic materials can be effectively prevented without a large scale investment on the equipment. Further, the gas-liquid separator can be made compact.

According to this embodiment, the organic wastes can be processed into homogeneous and uniform wastes bodies because the inorganic salts can be recovered in an ionic form without forming oxides and even inorganic materials existing in an oxide form from the beginning can be recovered to some extent in the liquid.

Embodiment 5

Figure 10:
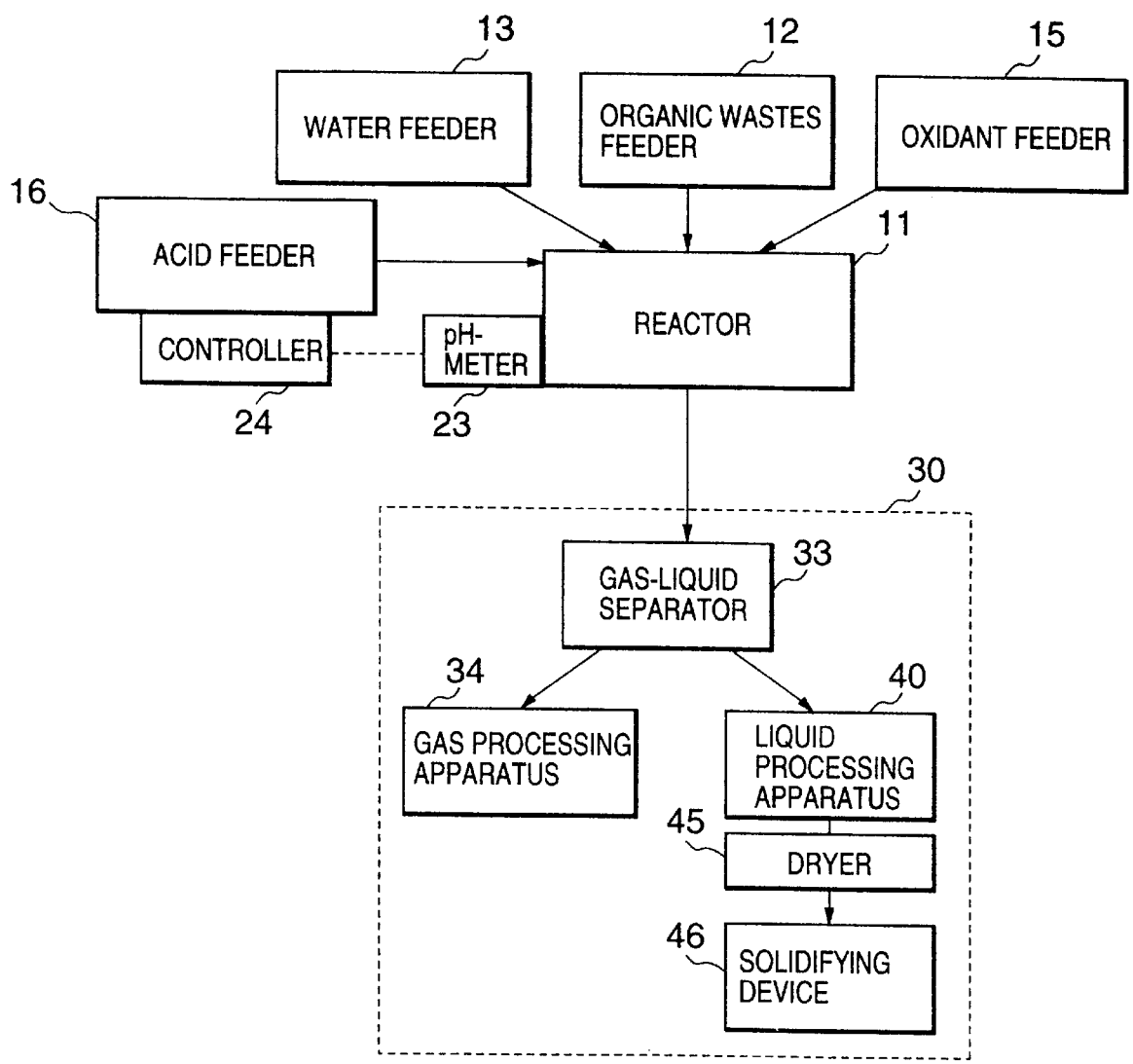
FIG. 10 is a schematic diagram showing a waste processing apparatus of Embodiment 5.

FIG. 10 is a schematic diagram showing a waste processing apparatus of Embodiment 5.

A waste processing apparatus of this embodiment is the same as that of Embodiment 4, except that this apparatus has an oxidant feeder 15 feeding the oxidant to the reactor 11.

According to the waste processing apparatus of this embodiment, in the reactor 11, the organic substances are rendered lower molecular in the supercritical water, then the pressure and the temperature of water are lowered to a subcritical state, and the lower-molecular products are oxidized and decomposed into carbon dioxide and water in the subcritical water.

The hydrogen ion concentration in the reactor 11 is adjusted to $10^{-4}$ mol per 1 kg of water by controlling the acid feeder 16 through the controller 24 based on the value measured by the pH-meter 23.

Preferably, the organic wastes to be processed does not include much impurities, inorganic additives, or organic salt additives. In the case that the organic wastes include a huge volume of inorganic additives and the like, the amount of the organic wastes to be processed at a time should be decreased. A separator for removing precipitated substances may be disposed so that the precipitated substances generated during the supercritical processing can be removed before the subcritical processing.

Thus, in the organic wastes processing apparatus of this embodiment, the inorganic materials can be prevented from being precipitated by carrying out the oxidation/decomposition in the subcritical state after rendering the organic substances lower molecular in the supercritical water.

Since the processing in the supercritical state and the subcritical state can be carried out in the same reactor, the cost of equipment can be suppressed and the operation is also simplified.

Furthermore, by adjusting the hydrogen ion concentration to $10^{-4}$ mol per 1 kg of water, the inorganic substances can be further effectively prevented from being precipitated.

By adjusting the feeding amount of the inorganic acid according to the type and the volume of the organic wastes and the volume of the oxidant, the hydrogen ion concentration can be controlled to the optimum state, even if the wastes include various types of organic substances.

Therefore, troubles such as plugging of the reactor due to precipitation of inorganic materials can be evaded, the running cost and the maintenance cost of the apparatus can be reduced. Further, when the inorganic materials include a radio-active material, operators can expect the reduction in the exposure to the radiation.

Further, through addition of the oxidant, a large volume of organic materials can be processed in a short time period.

Since inorganic salts can be recovered in an ion form without being converted to an oxide form and the inorganic materials existed in an oxide form from the beginning can be recovered in the liquid phase to some extent, the organic wastes can be processed into homogeneous and uniform wastes bodies.

Embodiment 6

Figure 11:
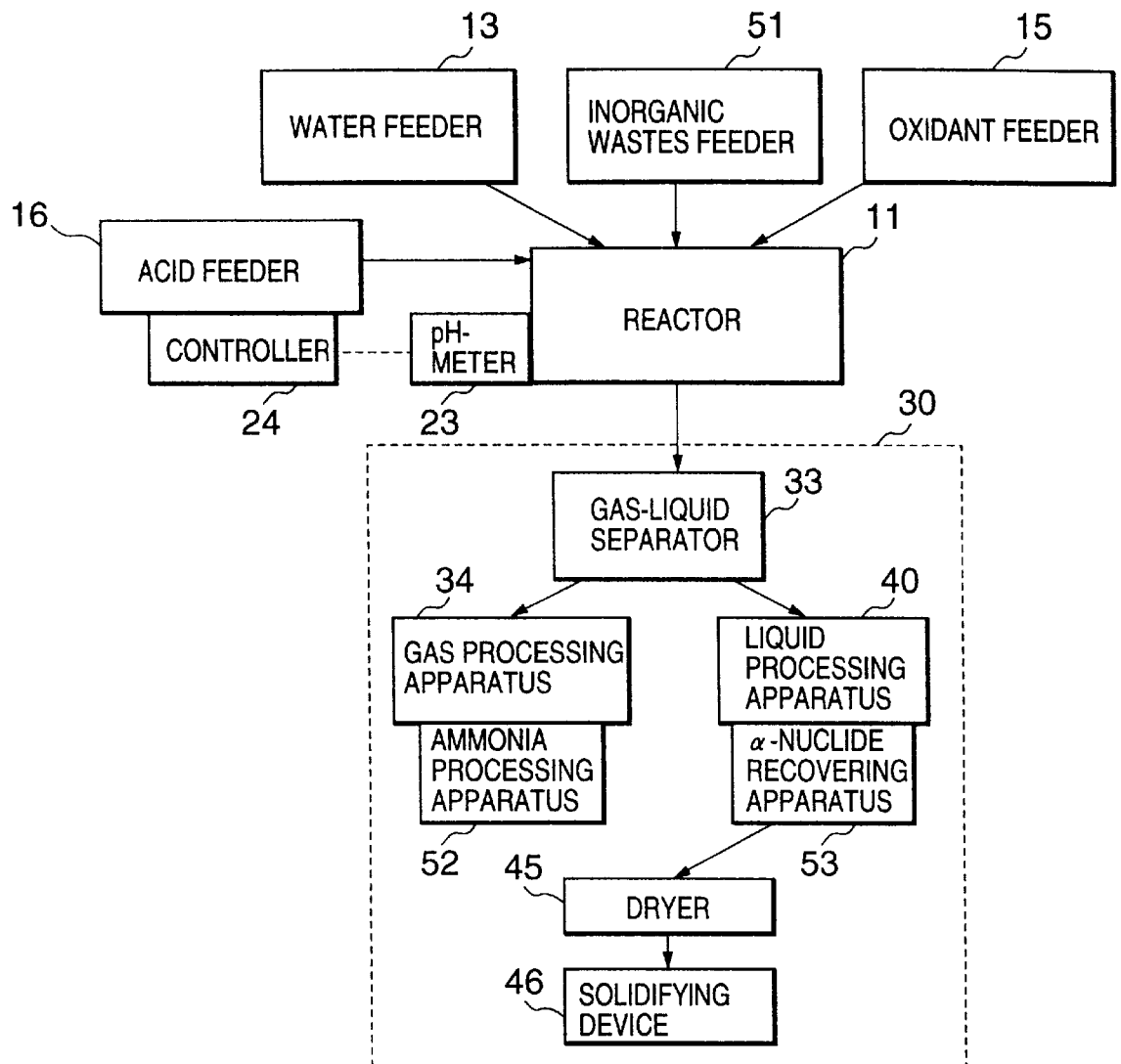
FIG. 11 is a schematic diagram showing a waste processing apparatus of Embodiment 6.

FIG. 11 is a schematic diagram showing a waste processing apparatus of this embodiment.

Figure 12:
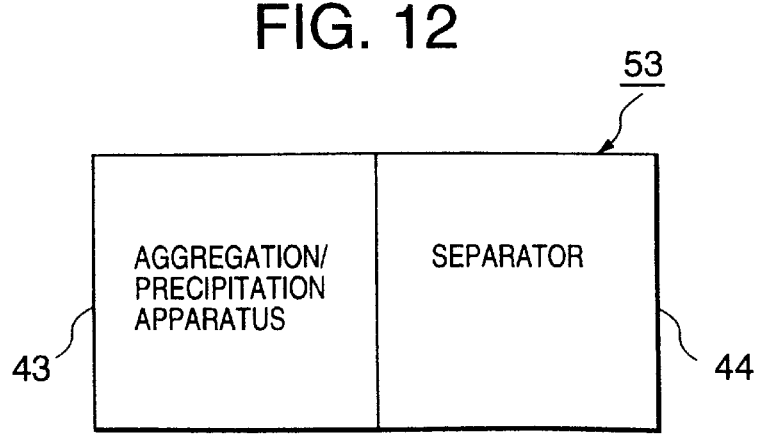
FIG. 12 is a schematic diagram showing a waste processing apparatus of Embodiment 7.

A waste processing apparatus of this embodiment has an identical constitution as that of Embodiment 5 except that, instead of the organic wastes feeder 12, an inorganic wastes feeder 51 feeding inorganic wastes to the reactor 11 is disposed, an ammonia processing apparatus 52 is provided to the gas processing apparatus 34, and an alpha-nuclide recovering device 53 is provided to the liquid processing apparatus 40. As is shown in FIG. 12, the alpha-nuclide recovering apparatus 53 has an aggregation/precipitation apparatus 43 and a separator 44 separating a solid component from the liquid.

The inorganic wastes also may be fed by the organic wastes feeder 12 without disposing the inorganic wastes feeder 51. Since both the organic wastes and the inorganic wastes can be processed with the same apparatus, it is preferable from the cost point of view.

As the object being processed, the wastes including only inorganic materials are preferable, for instance, solidified bodies including alpha-bearing wastes can be processed. However, the object is not restricted to the above, wastes including organic materials can be the object being processed.

When the inorganic wastes including a radioactive material such as alpha-emitting radionuclides or nitrate are actually processed by the present apparatus, water as the medium is fed to the reactor 11 by the water feeder 13. By the inorganic wastes feeder 51, the inorganic wastes are supplied to the water, which has been rendered supercritical in the reactor 11, mixed with the supercritical water, and kept in the supercritical state for a predetermined time period.

The hydrogen ion concentration in the reactor 11 is adjusted in such a manner that, based on the value measured by the pH-meter 23, the controller 24 controls the acid feeder 16 to add sulfuric acid to water so as to maintain the hydrogen ion concentration to $10^{-4}$ mol per 1 kg of water.

The inorganic wastes is oxidized/decomposed in the supercritical water in the reactor 11 in the presence of the oxidant.

In this embodiment, since the hydrogen ion concentration of water is adjusted to $10^{-4}$ mol per 1 kg, radioactive materials (for instance, alpha-emitting radionuclides including plutonium and the like) can be recovered in the liquid phase without being precipitated. The nitric acid or nitrate in the inorganic wastes can be decomposed without being precipitated and can be recovered as ammonia in the gas phase.

The generated fluid is transferred to the recovering apparatus 30 to be separated into gas and liquid at the gas-liquid separator 33, the gas and the liquid are, respectively, transferred to the gas processing apparatus 34 and the liquid processing apparatus 40.

At the ammonia processing apparatus 52, the gas including ammonia is heated to 310° C. or more in the presence of a platinum catalyst to convert the ammonia to nitrogen.

At the aggregation/precipitation apparatus 43 of the alpha-nuclide recovering apparatus 53, the liquid including the alpha-emitting radionuclides such as plutonium and the like is mixed with barium to form barium sulfate which is slightly soluble. The alpha-emitting radionuclides of valence III and IV co-precipitate together with barium sulfate. The alpha-emitting radionuclides of valence V and VI, after being reduced to valence III and IV by a reducing agent, are co-precipitated together with barium sulfate. If cesium, strontium, and the like are included in the liquid, they can be precipitated together through absorption by the absorbent such as zeolite, cobalt ferrocyanide, and titanic acid.

Further, when the liquid contains ammonia, after the adjustment of the pH to 9 through the addition of sodium hydroxide, the ammonia is expelled into the gas phase from the liquid.

Barium sulfate including the precipitated alpha-emitting radionuclides is collected at the separator 44 and is processed to glass solidified bodies or cement solidified bodies.

Other than barium, iron may be added to the liquid to adjust the pH to 4 or more so that the alpha-emitting radionuclides co-precipitates with the thus-produced iron hydroxide. Together with iron hydroxide, the alpha-emitting radionuclides can be processed to cement solidified bodies. Co-precipitation with lanthanum phosphate may be also carried out for collecting the alpha-emitting radionuclides.

The liquid from which the alpha-emitting radionuclides are removed is dried at the dryer 45, mixed with a solidifying agent at the solidifying device 46, and solidified in a waste processing vessel (e.g. a drum) to obtain solidified bodies of non-alpha-bearing wastes. As a solidifying agent, for instance, cement milk is used preferably.

As mentioned above, in the waste processing apparatus of this embodiment, by controlling the hydrogen ion concentration of the medium in the supercritical state to be $10^{-4}$ mol per 1 kg of water, inorganic materials such as a radioactive material and nitrate can be prevented from being precipitated. Therefore troubles such as plugging of the reactor due to precipitation of the inorganic materials can be evaded and the running cost and the maintenance cost of the apparatus can be reduced. Moreover reduction effect of the exposure to operators can be expected.

According to this embodiment, the solidified bodies of the alpha-bearing wastes do not include nitrate since almost all of nitrate ions are decomposed to nitrogen during the supercritical processing. Therefore, even when the solidified bodies are buried in the underground of a reducing atmosphere, ammonia is not generated and the radioactive materials such as plutonium can be prevented from being eluted from the solidified bodies.

Further, the non-alpha-bearing solidified body, which is obtained by solidifying the liquid/sludge from which alpha-emitting radionuclides are removed, can be land-filled in a rather shallow stratum and thus disposal of the wastes can be made easier. The wastes to be land-filled in a deep stratum can be thereby reduced, resulting in the reduction of the disposal cost.

For instance, if a glass solidified body is prepared by recovering the alpha-emitting radionuclides (e.g. plutonium) from a solidified body which is obtained from radio-active wastes by the conventional method, the volume of the alpha-bearing wastes can be remarkably reduced.

According to this embodiment, the alpha-emitting radionuclides are collected through precipitation, however, not only the alpha-emitting radionuclides, but also inorganic ions such as metals dissolved in the liquid phase can be precipitated.

In the waste processing apparatus of Embodiment 3 or 4, the identical constitutions may be employed.

Embodiment 7

Figure 13:
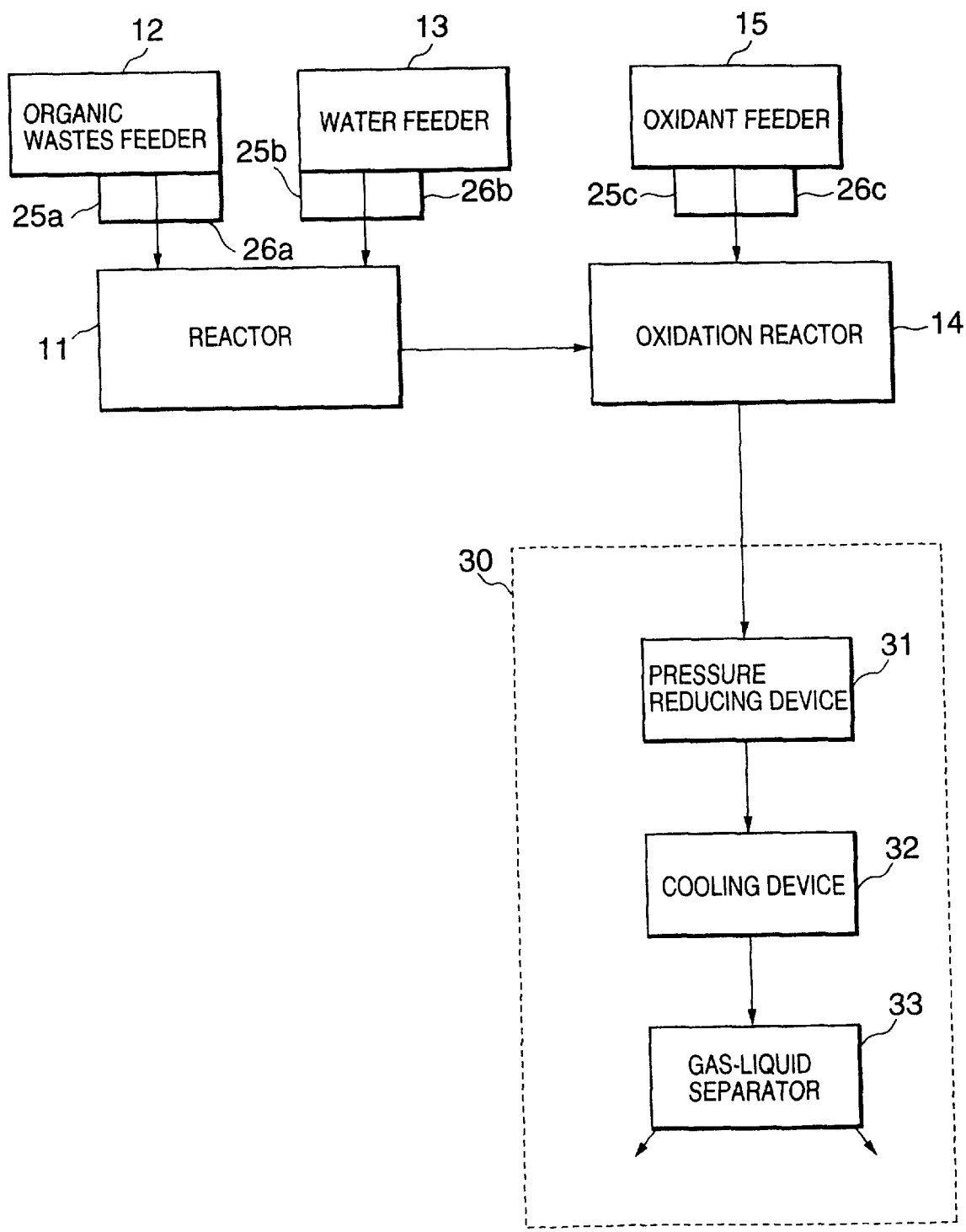
FIG. 13 is a schematic diagram showing an alpha-emitting radionuclides recovering apparatus of Embodiment 7.

The waste processing apparatus of this embodiment is constituted identical to the waste processing apparatus of Embodiment 3, except that this apparatus is provided with heater 25a and compressor 26a to the organic wastes feeder 12, heater 25b and compressor 26b to the water feeder 13, heater 25c and compressor 26c to the oxidant feeder 15, and a pressure reducing device 31 and a cooling device 32 to the recovering apparatus 30, as shown in FIG. 13.

In the waste processing apparatus of Embodiment 4 or 5, the organic wastes feeder 12, the water feeder 13, the oxidant feeder 15, and the acid feeder 16 can be provided with the identical heaters and the compressors, and the recovering apparatus 30 can be provided with the identical pressure reducing device and the cooling device.

In the waste processing apparatus of Embodiment 6, the inorganic wastes feeder 51, the water feeder 13, the oxidant feeder 15, and the acid feeder 16 can be provided with the identical heaters and the compressors, and the recovering apparatus 30 can be provided with the identical pressure reducing device and the cooling device.

The heaters 25a to 25c heat the organic wastes, the medium, and the oxidant, respectively, and the compressors 26a to 26c pressurize the organic wastes, the medium, the oxidant, respectively. According to such a constitution, the organic wastes, water, and the oxidant can be continuously fed to the reactor 11, and, without lowering the reaction temperature and the reaction pressure, the organic wastes can be processed continuously.

The decomposition products generated in the oxidation reactor 14 are transferred to the recovering apparatus 30 and are decompressed and cooled at the pressure reducing device 31 and the cooling device 32, respectively. With such a constitution, the fluid which is the products can be continuously taken out from the oxidation reactor 14, and the subsequent gas-liquid separation of the liquid at the gas-liquid separator 33 can be carried out effectively.

If the decomposition is carried out by adding oxygen to an organic substance, carbon is converted to carbon dioxide and hydrogen is converted to water. Under supercritical water conditions, due to arbitrary mixing of the water which is the medium and carbon dioxide generated through decomposition, separation thereof is difficult. However, if the fluid generated due to decomposition is cooled and decompressed to room temperature and atmospheric pressure, most of the water and carbon dioxide can be separated.

Thus, according to this embodiment, the processing speed can be enhanced and the running cost can be largely decreased compared with conventional batch processing. Further, the gas-liquid separation at the gas-liquid separator 33 can be carried out effectively.

Embodiment 8

Figure 14:
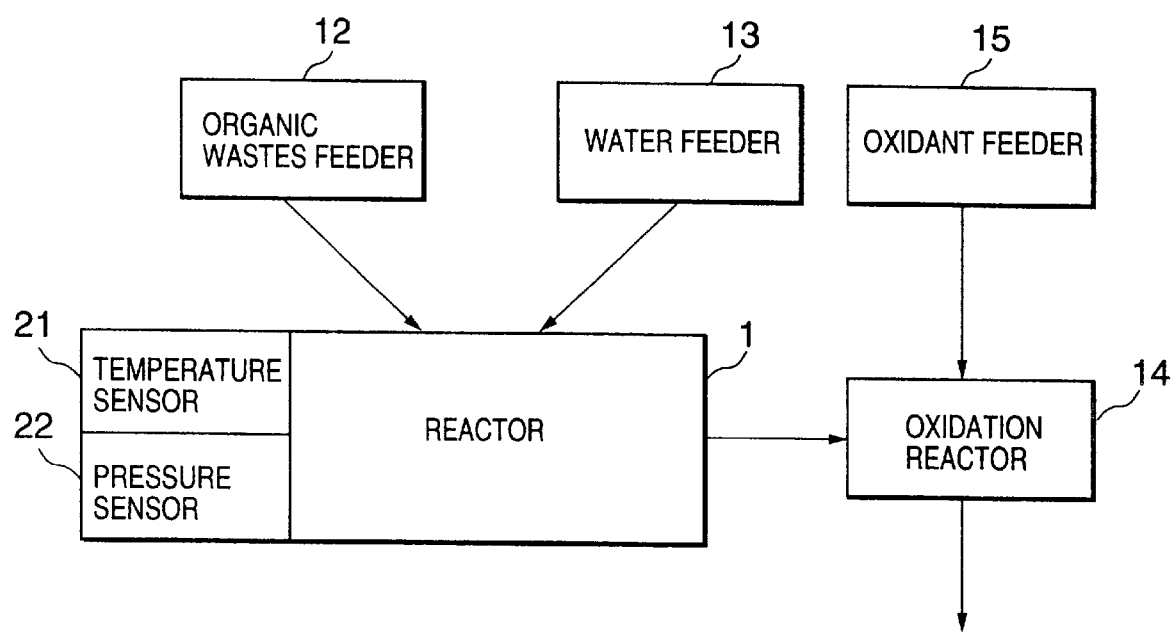
FIG. 14 is a schematic diagram showing a part of a waste processing apparatus of Embodiment 8.

The waste processing apparatus of this embodiment is the same as that of Embodiment 3, except that this apparatus is provided with, as shown in FIG. 14, a temperature sensor 21 and a pressure sensor 22 to the reactor.

In the waste processing apparatus of Embodiment 4, 5, 6 or 7, the identical constitutions can be employed.

Figure 15:
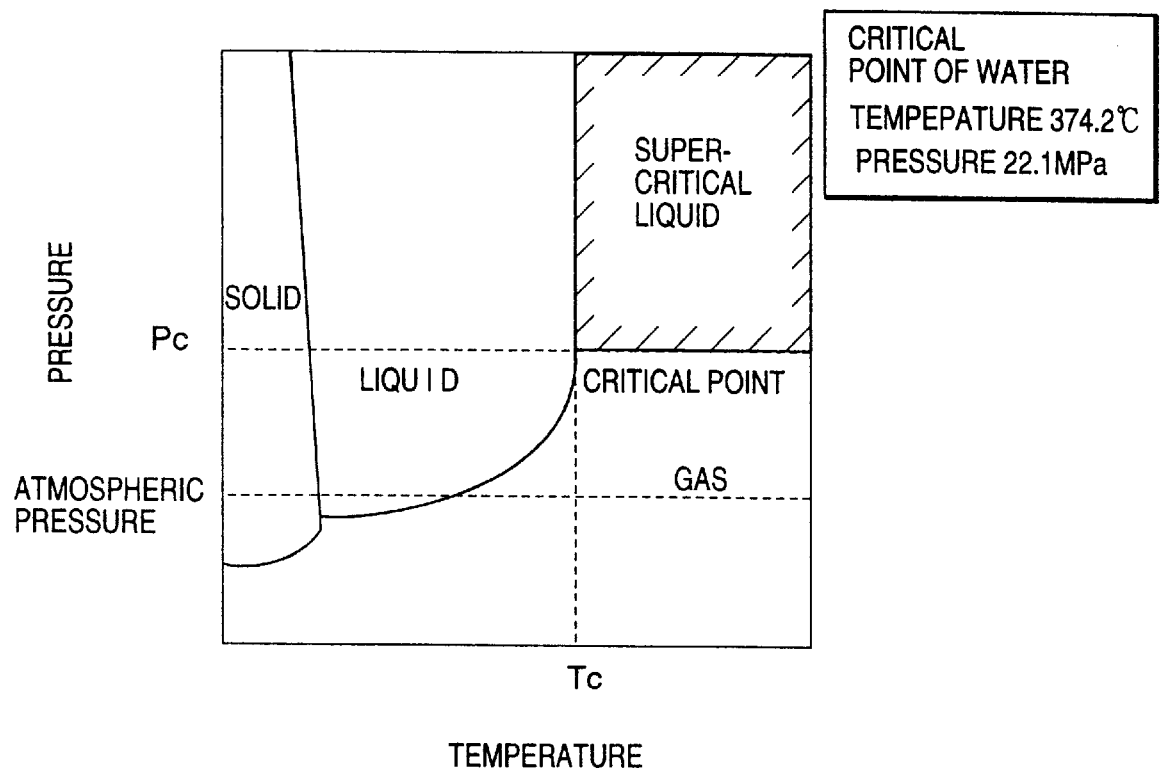
FIG. 15 is a graph showing a phase diagram of water.

In FIG. 15, the phase diagram of water is shown. Since the state of water is determined by the temperature and the pressure, whether the inside of the reactor 11 is in a supercritical state or in a subcritical state can be evaluated through observation of the temperature and the pressure in the reactor 11.

By monitoring the temperature and the pressure inside the reactor 11 with the temperature sensor 21 and the pressure sensor 22, whether the medium in the reactor 11 is in a supercritical state or not can be correctly evaluated, thereby the wastes can be processed under the optimum state.

It is preferable to estimate whether the medium in the oxidation reactor 14 is in a subcritical state or not by providing the temperature sensor and the pressure sensor not only to the reactor 11 but also to the inside of the oxidation reactor 14.

When the apparatus has the heaters 25a to 25c and the compressors 26a to 26c, as is described in Embodiment 7, the temperature and pressure of the wastes and the medium heated and pressurized may be measured prior to being fed to the reactor. The conditions inside the reactor can be thereby estimated without directly measuring the temperature and pressure inside the reactor.

Embodiment 9

Figure 16:
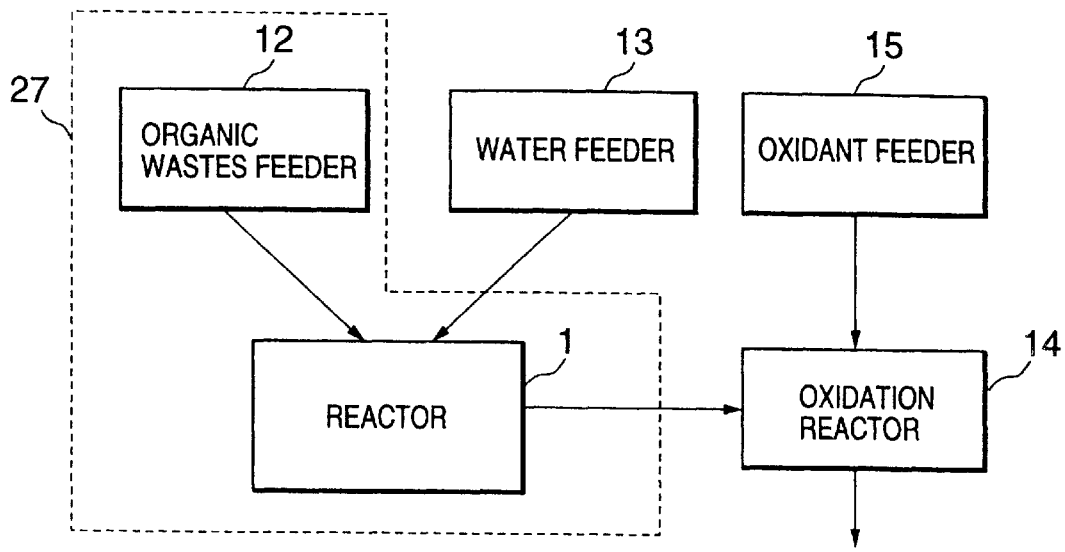
FIG. 16 is a schematic diagram showing a part of a waste processing apparatus of Embodiment 9.

The waste processing apparatus of Embodiment 9 is the same as that of Embodiment 3, except that at least a part of the reactor 11 and the organic wastes feeder 12 of this apparatus is disposed inside a glove box 27 as shown in FIG. 16.

The waste processing apparatus of Embodiment 4, 5, 6, 7 or 8 can be constituted in a similar manner.

When organic wastes contaminated by radioactive materials or hazardous substances are processed, the radioactive materials or the hazardous substances are required to be prevented from leaking outside. According to the waste processing apparatus of Embodiment 3, almost all processing steps are carried out in a closed system, however, the organic waste feeding apparatus 12 partially becomes an open system due to receipt of the organic wastes. Therefore, when the organic wastes contaminated by radioactive materials or hazardous substances are processed, the spread of contamination must be prevented by disposing the organic wastes feeder 12 inside a covering member such as a hood or a glove box.

Further, the covering member such as the hood or the glove box is preferred to be made an explosion-resistant specification. Thereby, the processing can be carried out even when volatile organic substances liable to explode are generated due to decomposition of the organic wastes or volatile organic substances liable to explode are stuck to the organic wastes.

According to this embodiment, since a part of the processing apparatus is disposed inside the glove box, the scale of the equipment can be made compact compared with the case where whole apparatus is disposed inside the covering member.

Embodiment 10

Figure 17:
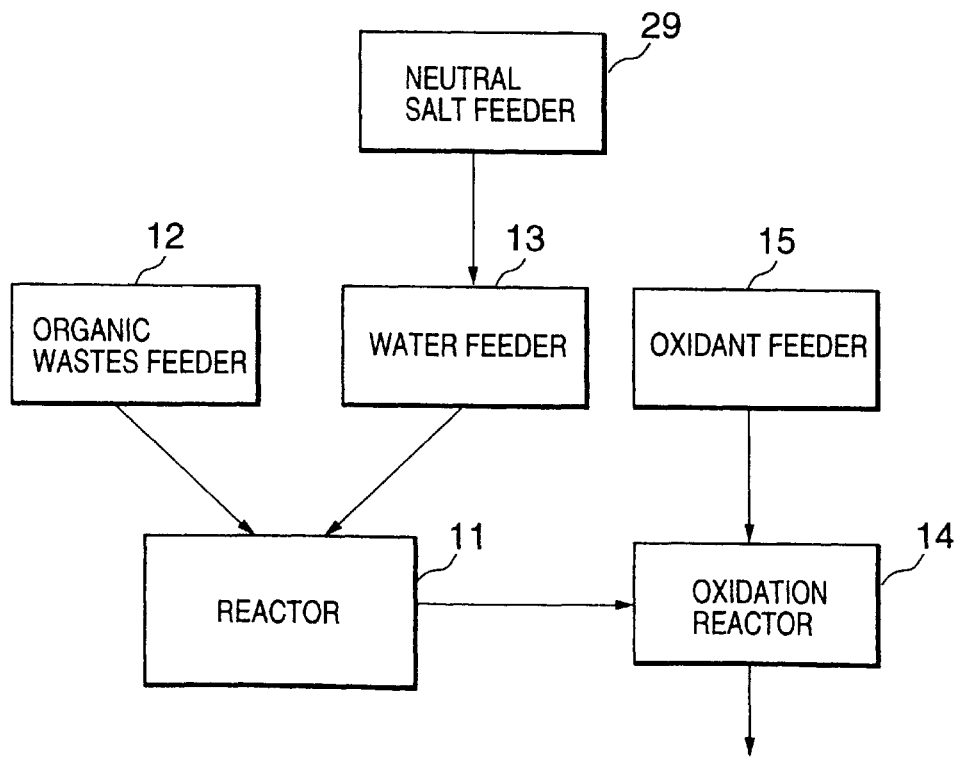
FIG. 17 is a schematic diagram showing a part of a waste processing apparatus of Embodiment 10.

The waste processing apparatus of embodiment 10 is the same as that of Embodiment 3, except that this apparatus is provided with a neutral salt feeder 29 for adding a neutral salt to the water which is the medium, as shown in FIG. 17.

In the waste processing apparatus of Embodiment 4, 5, 6, 7, 8 or 9, a similar structure can be employed.

In general, a solubility product Ks of a salt $M_nL_m$ which is difficult to be dissolved is expressed as Equation X using the activity.

$$M^{m+} + L^{n-} \rightarrow M_nL_m, \quad K_s = a_1^m \cdot a_2^n \tag{X}$$

$a_1$: activity of $M^{m+}$, $a_2$: activity of $L^{n-}$

The activity a is expressed as Equation XI with an activity coefficient γ and a concentration C.

$$a = \gamma \cdot C \tag{XI}$$

When the temperature and the pressure are definite, the activity becomes definite, Ks has a definite value, accordingly. In a diluted solution, being γ=1, the activity a becomes equal with the concentration C. However, when the ionic strength increases, the γ becomes γ<1, resulting in the increase of the concentration C, and the soluble $M^{m+}$ and $L^{n-}$ in the solution increase, thereby the solubility tends to increase.

Therefore, when a neutral salt is added, the solubility of the slightly soluble salt increases, resulting in suppression of precipitation.

As such a neutral salt, sodium chloride, potassium chloride, calcium chloride, magnesium chloride, sodium sulfate, and potassium sulfate are preferably employed.

According to this embodiment, by addition of a neutral salt, the precipitation of the inorganic substance can be more effectively suppressed.

Embodiment 11

Figure 18:
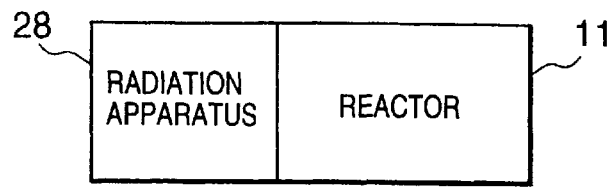
FIG. 18 is a schematic diagram showing a part of a waste processing apparatus of Embodiment 11.

The waste processing apparatus of Embodiment 11 is the same as that of Embodiment 3, except that this apparatus is provided with a radiation apparatus 28 radiating radial rays to the content of the reactor, as shown in FIG. 18.

The waste processing apparatus of Embodiment 4, 5, 7, 8, 9 or 10 can employ the identical constitution.

Instead of a radiation apparatus, a ultra-violet ray radiating apparatus radiating ultra-violet rays can be used.

When radial rays are radiated to water, the OH radical is generated, as shown in the following Equation XII.

$$H_2O \rightarrow H + OH \cdot \tag{X}$$

The OH radical is a powerful oxidant as shown in Equation I, thus the organic substances can be decomposed without employing an oxidant.

Further, if the ultra-violet rays or the radial rays are radiated in the presence of an oxidant, this reaction can be further accelerated. For instance, oxygen generates radicals due to the radiation and finally produces hydrogen peroxide. The hydrogen peroxide reacts as the following Equation XIII by radiation to generate the OH radical, resulting in decomposition of the organic substances.

$$H_2O_2 + h\nu \rightarrow 2OH \cdot \tag{XIII}$$

Ozone reacts with ultra-violet rays as the following Equation XIV to produce hydrogen peroxide. Further, the hydrogen peroxide reacts with the ultra-violet rays as Equation XIII to produce the OH radical.

$$O_3 + H_2O + h\nu \rightarrow H_2O_2 + O_2 \tag{XIV}$$

Further, the hydrogen atom generated by Equation XII reacts with oxygen as Equation XV to generate the hydroperoxy radical, further the hydroperoxy radical reacts with ozone as shown in Equation XVI to generate the OH radical.

$$H + O_2 \rightarrow HO_2 \cdot \tag{XV}$$

$$O_3 + HO_2 \cdot \rightarrow OH \cdot + 2O_2 \tag{XVI}$$

Therefore, due to radiation, the OH radical can be effectively produced, thereby effectively decomposing the organic substance.

Incidentally, when the wastes including radioactive material are processed, without relying on the extraneous radiation source, radiation field can be easily produced. Thus, without a radiation apparatus, the above described effect can be obtained.

Embodiment 12

Figure 19:
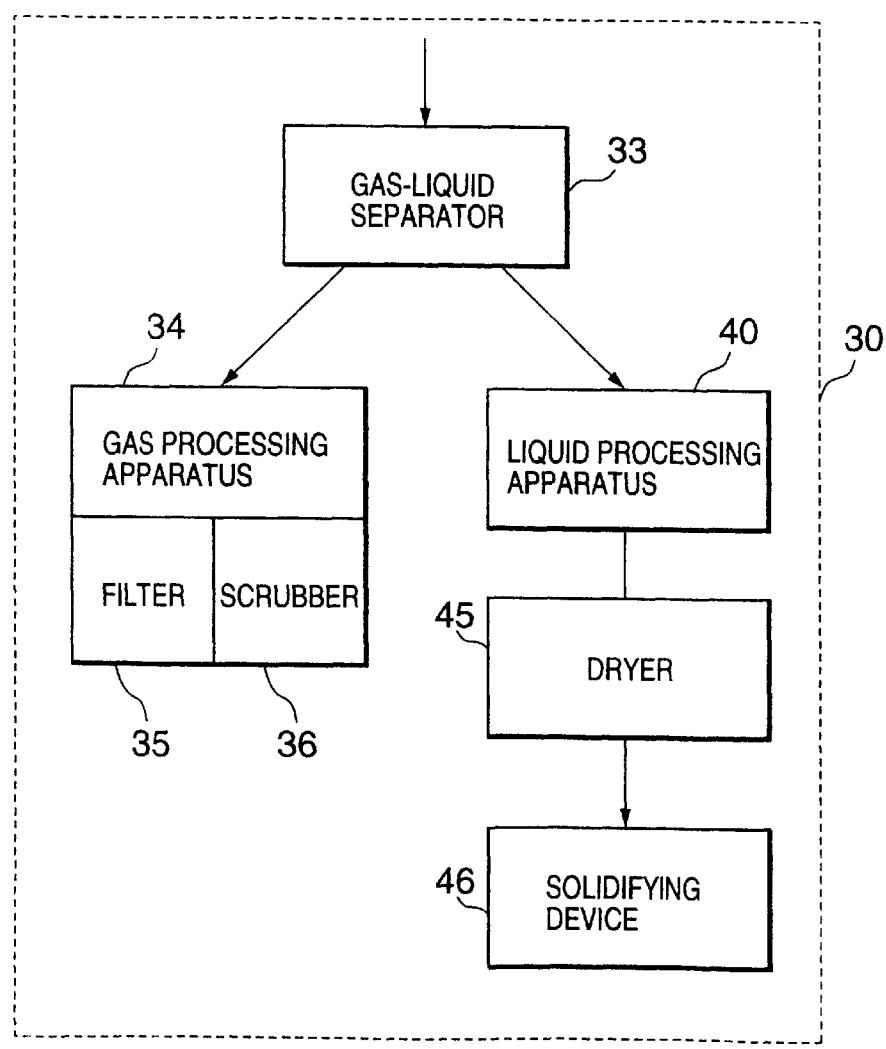
FIG. 19 is a schematic diagram showing a part of a waste processing apparatus of Embodiment 12.

The waste processing apparatus of Embodiment 12 is the same as that of Embodiment 3, except that this apparatus is provided with a filter 25 removing a solid component or hazardous component contained in the gas phase, and a scrubber 26 recovering hazardous substances contained in the gas phase, as shown in FIG. 19.

The identical structure can be employed in the waste processing apparatus of Embodiment 4, 5, 6, 7, 8, 9, 10 or 11.

For instance, when wastes contaminated by radioactive materials generated from a reprocessing plant are processed, volatile elements such as technetium and ruthenium move into the gas phase.

Ruthenium moves into the gas phase as ruthenium tetra-oxide, however, when an organic substance exists, ruthenium tetra-oxide is reduced to ruthenium dioxide ($RuO_2$).

Since ruthenium dioxide is in a solid form at room temperature, it can be removed by a filter.

Further, technetium becomes di-technetium heptoxide or per-technetic acid and moves into the gas phase, however, when being in contact with water, as shown in Equations XVII and XVIII, technetium is dissolved in water in an ionic form.

$$Tc_2O_7\ (g) + H_2O \rightarrow 2HTcO_4\ (g) \quad (XVII)$$

$$HTcO_4\ (g)\ TcO_4^- + H^+ \quad (XVIII)$$

Therefore, when a scrubber is disposed, technetium can be recovered in a liquid.

In order to recover the elements such as technetium and the like more effectively, it is preferable to use an alkaline solution including sodium hydroxide other than water or water including a reducing agent for the scrubber.

Technetium, when being in contact with water, as shown in Equations XVII and XVIII, dissolves in a form of negative ion. Since the negative ions produce a salt through reaction with sodium ions, technetium can be recovered in a form of salt in the solution.

$$HTcO_4 + NaOH \rightarrow NaTcO_4 \cdot + H_2O \quad (XIX)$$

Further, technetium, when a reducing agent exists, is reduced from a pertechnetic acid (VII-valent) to technetium dioxide (IV-valent). Since the solubility of technetium dioxide in water of room temperature and atmospheric pressure is small, technetium can be recovered in a solid form in water.

Thus, according to this embodiment, solid components or volatile hazardous elements moving into the gas phase due to entrainment can be removed and the wastes contaminated with radioactive materials can be processed safely.

Embodiment 13

Figure 20:
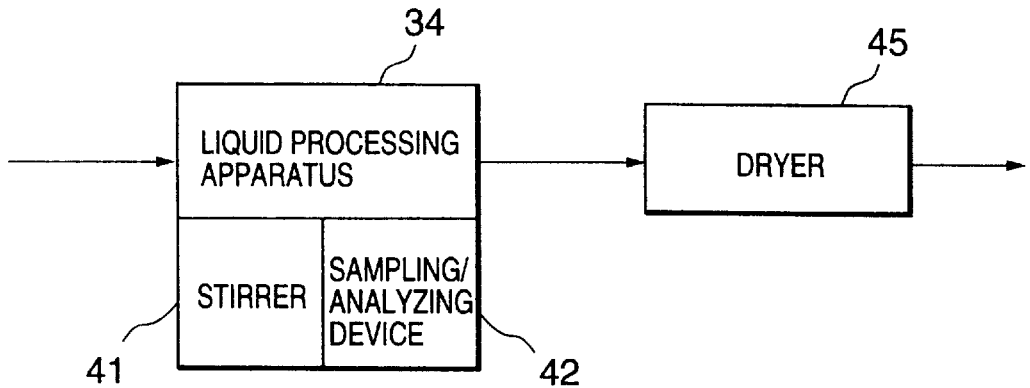
FIG. 20 is a schematic diagram showing a part of a waste processing apparatus of Embodiment 13.

The waste processing apparatus of Embodiment 13 is the same as that of Embodiment 3, except that the liquid processing apparatus of this apparatus is provided with a stirrer 41 for stirring the liquid and a sampling/analyzing apparatus 42 for sampling/analyzing the liquid, as shown in FIG. 20.

A similar structure can be employed in the waste processing apparatus of Embodiment 4, 5, 6, 7, 8, 9, 10, 11 or 12.

When the liquid transferred from the gas-liquid separator 33 to the liquid processing apparatus 34 is stirred by the stirrer 41, the liquid phase can be made uniform. When a part of the uniformed liquid is sampled and analyzed by the sampling/analyzing apparatus 42, the composition of the whole liquid phase can be estimated, and, in the solidifying device 46, a solidifying means most suitable for storage and processing can be selected. Further, since the content of the solidified bodies becomes apparent, management of storage and processing can be thereby made easy.

Further, even if the solid suspension is included in the liquid, they can be made uniform due to stirring by the stirrer 41, thus the solidifying processing at the solidifying device 35 can be made easy.

When the sampling/analyzing apparatus 41 is not disposed, since the content of the solidified bodies is not clear, a means for measuring the content is required for the management point of view. However, measurement of the content of the solidified bodies is low in accuracy, since sampling of the representative sample is difficult, resulting in a management problem.

Embodiment 14

Figure 21:
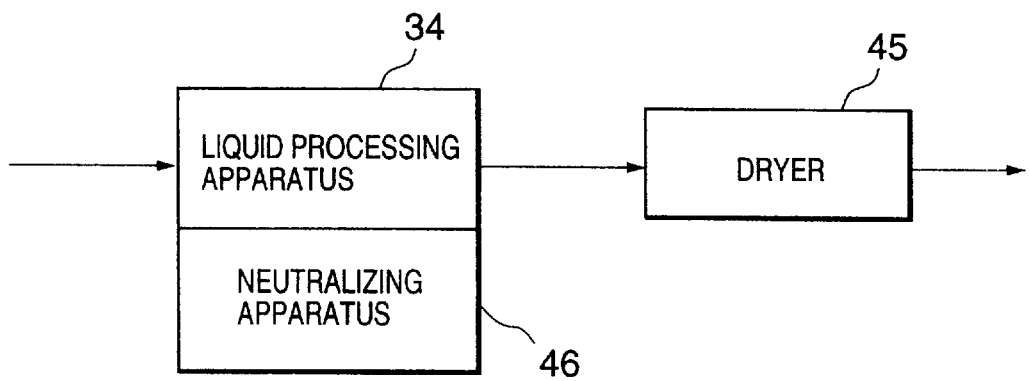
FIG. 21 is a schematic diagram showing a part of a waste processing apparatus of Embodiment 14.

The waste processing apparatus of Embodiment 14 is the same as that of Embodiment 3, except that the liquid processing apparatus 34 of this apparatus is provided with a neutralizing processing apparatus 46 neutralizing acids and alkalis included in the liquid, as shown in FIG. 21.

The identical structure can be applied to the waste processing apparatus of Embodiment 4, 5, 6, 7, 8, 9, 10, 11, 12, or 13.

For instance, when radio-active solid wastes including technetium are processed, technetium is converted to di-technetium heptoxide and is released into the gas phase.

However, after recovering the decomposition products to the recovering apparatus 30 from the oxidation reactor 14, if an alkali such as sodium hydroxide is added at the neutralizing processing apparatus 46, as is shown in Equation XIX, technetium remaining a little in the liquid after gas-liquid separation can be stabilized in the liquid phase.

Thus, according to this embodiment, the solidifying processing can be carried out easily at the solidifying device since the hazardous substance such as a radioactive material in the liquid can be stabilized.

Embodiment 15

Figure 22:
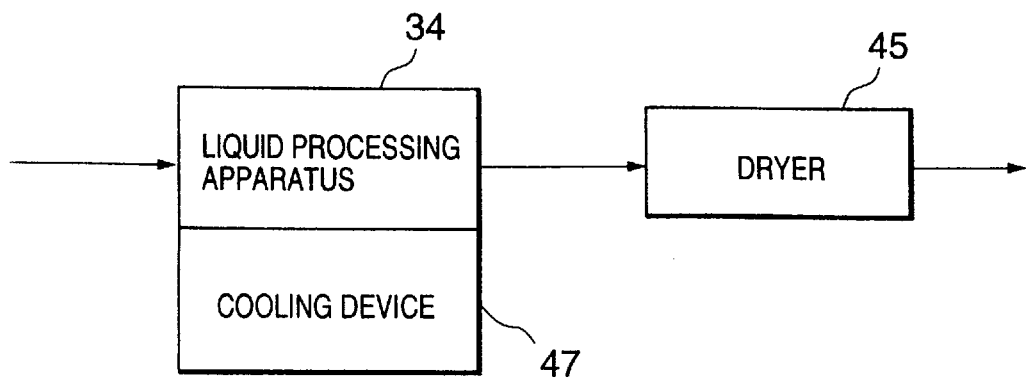
FIG. 22 is a schematic diagram showing a part of a waste processing apparatus of Embodiment 15.

The waste processing apparatus of Embodiment 15 is the same as that of Embodiment 3, except that this apparatus is provided with a cooling device 47 for cooling the liquid phase to the liquid processing apparatus 34, as shown in FIG. 22.

A similar structure can be applied to the waste processing apparatus of Embodiment 4, 5, 6, 7, 8, 9, 10, 11, 12, 13, or 14.

When radio-active wastes are processed, without cooling, the liquid readily boils due to the heat from radioactive materials in the liquid processing apparatus 30. Thus, there is a likability of proliferation of contamination of the radioactive material. If the liquid is cooled with the cooling device 47, such a risk can be evaded and the radioactive material can be kept safe in the liquid phase.

Embodiment 16

Figure 23:
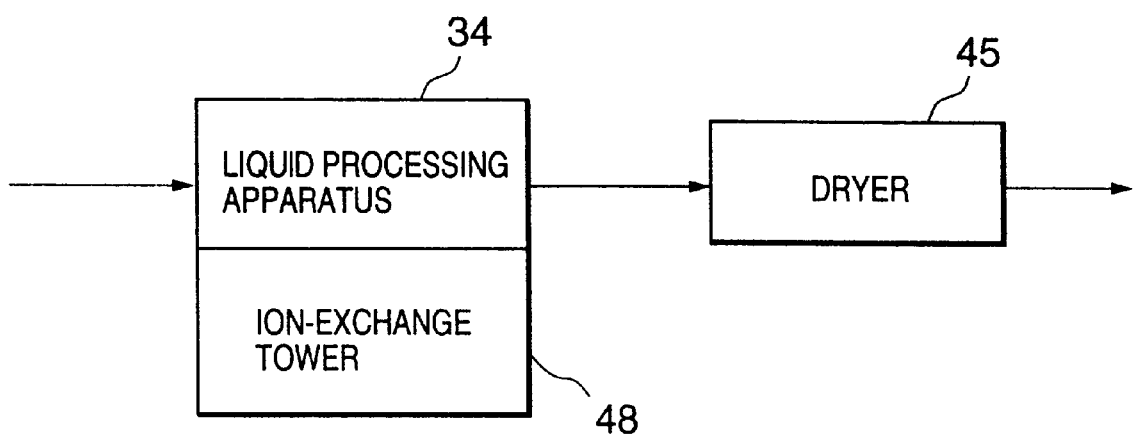
FIG. 23 is a schematic diagram showing a part of a waste processing apparatus of Embodiment 16.

The waste processing apparatus of Embodiment 16 is the same as that of Embodiment 3, except that the liquid processing apparatus 34 of this apparatus is provided with an ion-exchange tower 48, as shown in FIG. 23.

A similar constitution can be applied to the waste processing apparatus of Embodiment 4, 5, 6, 7, 8, 9, 10, 11, 12, 13, 14, or 15.

For instance, when wastes contaminated by a radioactive material generated from a reprocessing plant are processed, volatile elements such as technetium and ruthenium move into the gas phase, however, a part thereof remains in the liquid phase and each of technetium and ruthenium exists in the liquid as a per-technetic acid and ruthenium chloride complexes or ruthenium nitrosyl nitrato complexes, respectively.

The per-technetic acid, being anion, can be removed with an anion-exchange resin, and the ruthenium, being cation, can be removed with a cation-exchange resin.

Thus, according to this embodiment, since hazardous ionic components such as the radioactive materials included in the solution of the decomposition products can be removed, the remaining solution can be discharged outside the system, the processing cost of the wastes accordingly can be reduced.

Further, as a result of the removal of the hazardous ionic component in the liquid, the liquid phase and the solid phase become uniform and homogeneous in the waste liquid fed from the liquid processing line to the solidifying device. By adding the solidifying agent to this waste liquid, uniform and homogeneous solidified bodies can be obtained by a simple process, in other words, solidified bodies stable for storage and processing can be obtained.

Embodiment 17

Figure 24:
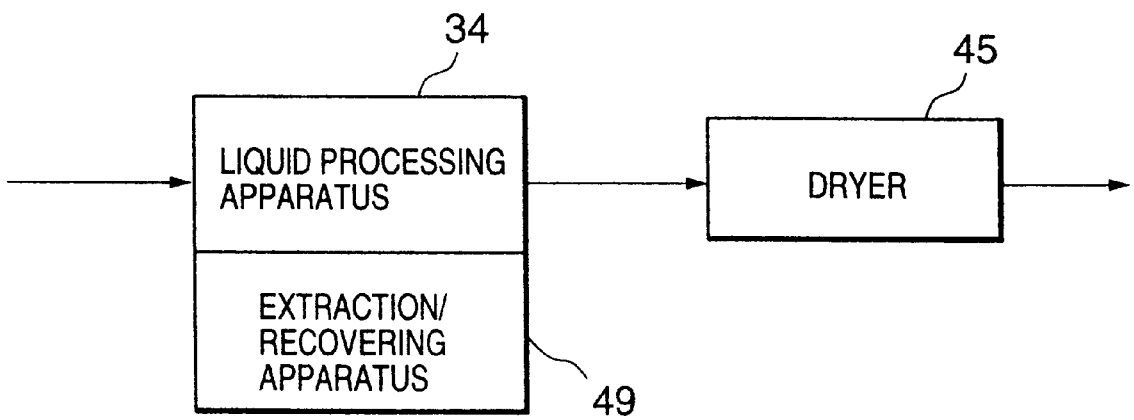
FIG. 24 is a schematic diagram showing a part of a waste processing apparatus of Embodiment 17.

The waste processing apparatus of Embodiment 17 is the same as that of Embodiment 3, except that the liquid processing apparatus 34 of this apparatus is provided with an extraction/recovery apparatus 49, which recovers hazardous inorganic ions in the water to an extracting agent through contact of the liquid and the extracting agent, as shown in FIG. 24.

A similar constitution can be employed in the waste processing apparatus of Embodiment 4, 5, 7, 8, 9, 10, 11, 12, 13, 14, or 15.

For instance, in radioactive wastes generated from a reprocessing plant, such nuclear fuel substances as uranium, plutonium are included. Organic wastes including these elements, when being solidified, become alpha-bearing wastes, the processing cost of the solidified bodies accordingly increases. Thus, these elements are required to be removed from the wastes.

As the extracting agents, a neutral organophosphorous compound such as tri-butyl phosphate (hereinafter referred to as TBP) and an acidic organophosphorous compound such as dihexyl phosphoric acid (HDEHP) can be used.

Figure 25:
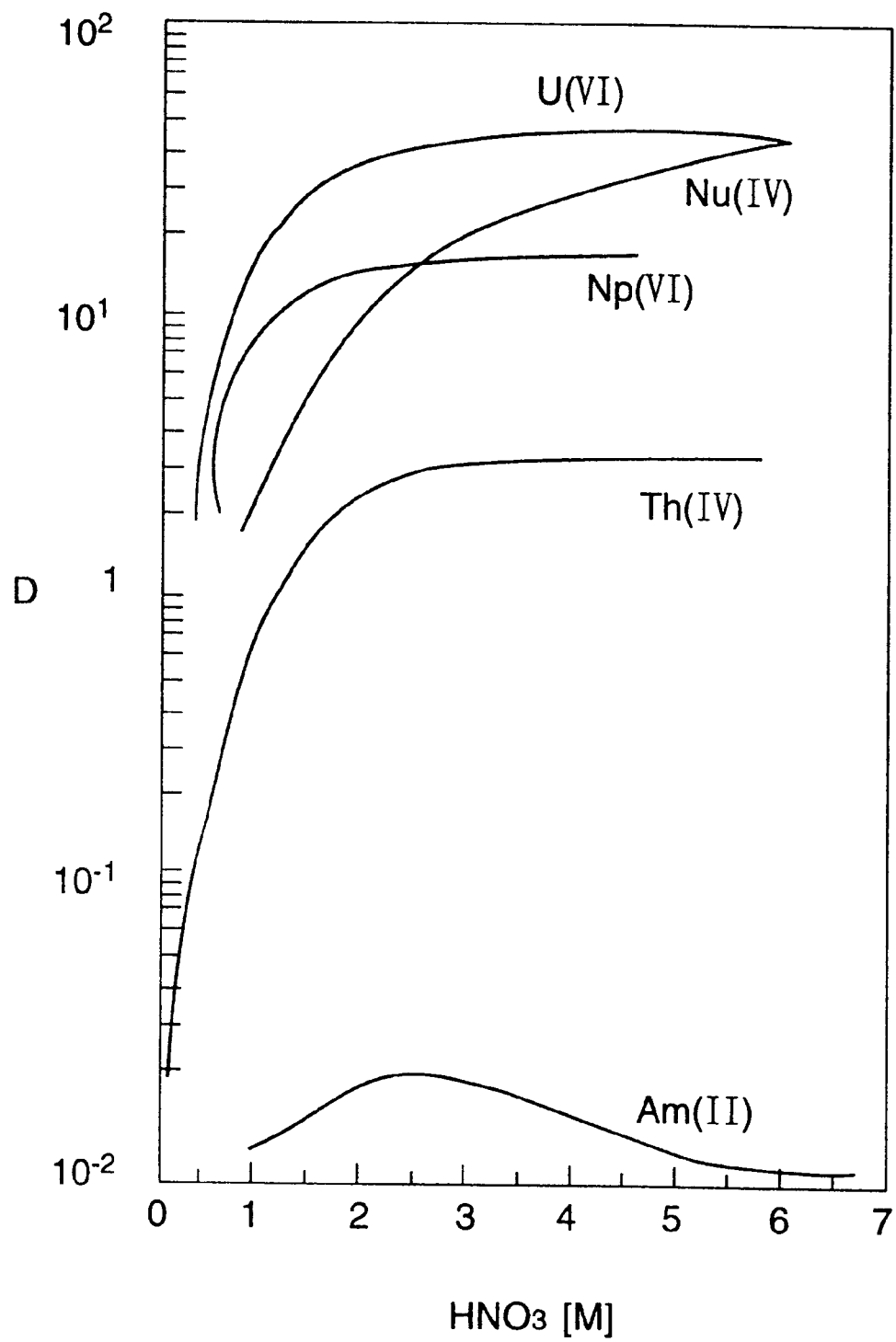
FIG. 25 is a diagram showing the distribution ratio of actinoids in 30%TBP-nitric acid system.

In FIG. 25, the distribution coefficients of the actinoids in a 30% by volume TBP-nitric acid system are shown. When the nitric acid concentration is 3 mol/litter, the distribution coefficients of uranium, plutonium, and neptunium are more than 10 and that of thorium is more than 3.

When the liquid to be recovered to the liquid processing apparatus, after its acid concentration is adjusted to 3 mol/l by the extraction/recovery apparatus 49, is allowed to be in contact with TBP, the actinoids such as plutonium can be recovered in TBP. Further, if the TBP including the actinoids such as plutonium is allowed to be in a contact with a diluted acid, the actinoids such as plutonium can be recovered in the diluted acid.

Figure 26:
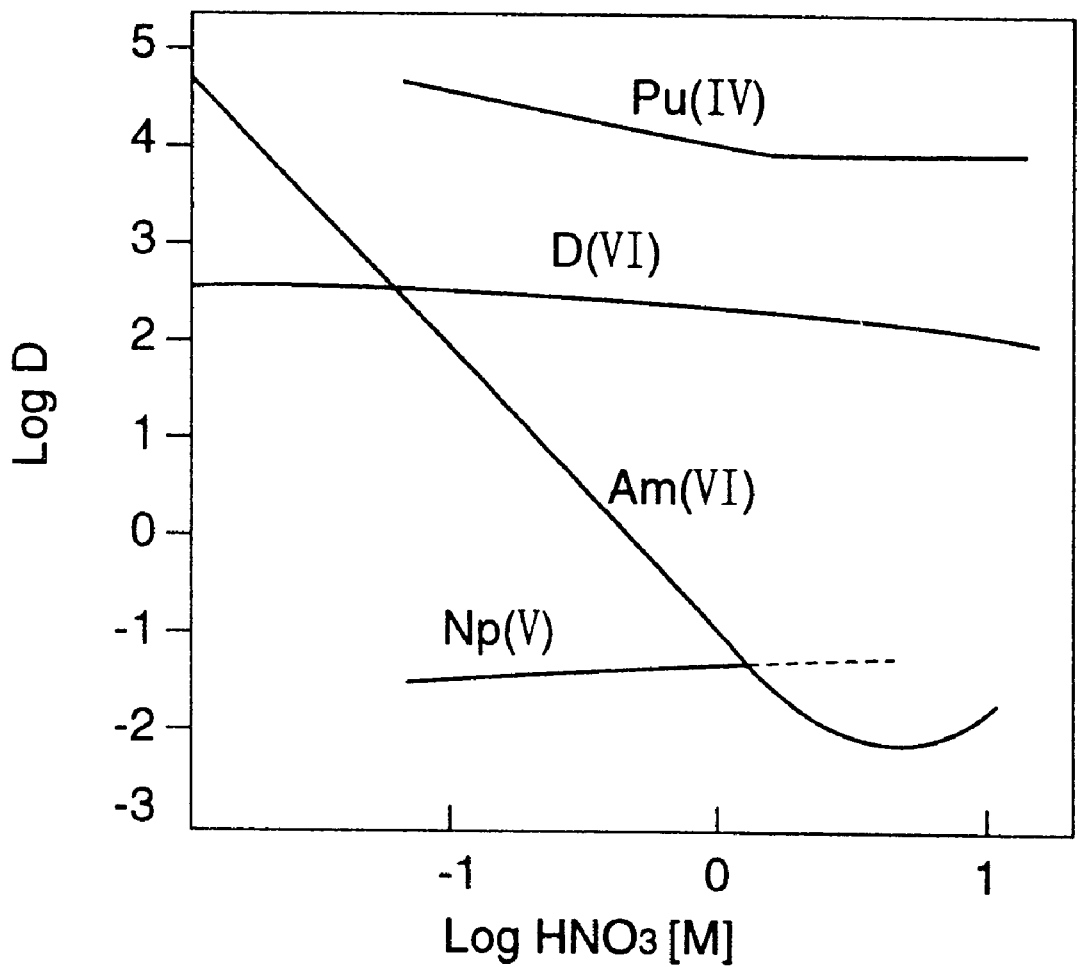
FIG. 26 is a diagram showing the distribution ratio of actinoids in HDEHP-nitric acid system.

In FIG. 26, the distribution coefficients of the actinoids employing HDEHP are shown. Even if the nitric acid concentration is below $10^{-1}$ mol/l, the distribution coefficients of plutonium, uranium, and americium become more than 100, thus, they can be recovered in HDEHP. Further, when an acid of about 1 mol/l including a reducing agent such as hydrazine is allowed to be in contact with HDEHP, VI-valent plutonium or uranium is reduced to III-valence and is recovered in the acid.

When the HDEHP is used, since the actinoids can be recovered at an acid concentration of about $10^{-1}$ mol/l, compared with the case where a neutral organophosphorous compound such as TBP is used, the acid amount to be added to a separation/recovery device can be reduced, thereby the running cost can be reduced.

As a diluting agent of the extracting agent such as the above described TBP or HDEHP, supercritical carbon dioxide are preferably used so as to reduce the volume of the used organic solvent, resulting in a reduction in the processing cost of the secondary wastes.

The specific density of TBP at room temperature and atmospheric pressure is about 1 g/ml, that is, is equal with that of water, thus the addition of normal-dodecane as a diluting agent to TBP can easily separate the organic phase and the water phase. When TBP and normal-dodecane are used for recovering a radioactive material such as plutonium, they become radio-active and required to be processed as radio-active organic wastes.

In general, since the mixing ratio of TBP to normal-dodecane is approximately 30:70 by volume, the normal-dodecane amount to be processed becomes more than 2 times that of TBP. Therefore, if there is no necessity to process the normal-dodecane, the processing cost can be reduced to one third.

Since carbon dioxide becomes a supercritical state under conditions of above 31° C., 7.4 MPa and can be mixed with an organic substance at an arbitrary ratio, when the TBP is allowed to be in contact with the supercritical carbon dioxide, the actinoids such as plutonium and the like can be recovered in the TBP from the decomposition liquid. When returned to room temperature and atmospheric pressure after being used, the carbon dioxide becomes a gas and is easily separated from the TBP, the processing of the carbon dioxide is not required accordingly.

Therefore, if the carbon dioxide in its supercritical state is used as a diluting agent, the processing cost can be drastically reduced.

As described above, according to this embodiment, by recovering the hazardous inorganic ions in the liquid with the extracting agent, processing cost of the solidified body can be reduced.

Further, as the result of the removal of the hazardous inorganic ions from the liquid, the waste liquid to be fed to the solidifying device from the liquid processing apparatus is uniform and homogeneous in its liquid phase and solid phase. By only adding a solidifying agent to the waste liquid, uniform and homogeneous solidified bodies can be obtained, in other words, by a simple process, solidified bodies stable for storage and processing can be obtained.

What is claimed is:

1. A waste processing method comprising:
   a step of decomposing substantially all of an organic substance included in organic wastes into lower-molecular-weight products by holding the organic wastes in a medium, which is in a supercritical state thereof, for a predetermined time period; and
   a step of oxidizing and decomposing the lower-molecular-weight products into carbon dioxide, and/or water by holding a mixture of an oxidant and the lower-molecular-weight products in the medium, which is in a subcritical state thereof, for a pre-determined time period.

2. The waste processing method as set forth in claim 1, further comprising:
   a step of rendering the medium supercritical; and
   a step of obtaining a mixture of the medium in a supercritical state thereof and the organic wastes.

3. The waste processing method as set forth in claim 1:
   wherein the organic wastes contain a nitrate, a sulfate, a chloride, a phosphate, a silicate, or mixtures thereof.

4. The waste processing method as set forth in claim 1:
   wherein the medium is water, carbon dioxide, a hydrocarbon, or mixtures thereof.

5. The waste processing method as set forth in claim 1: wherein at least the stoichiometric value, necessary for completely oxidizing the organic wastes, of oxygen, air, hydrogen peroxide, ozone, or mixtures thereof is used as the oxidant.

6. The waste processing method as set forth in claim 1, further comprising a step of adding an acid to the medium in a supercritical state so that the hydrogen ion concentration of the medium in a supercritical state thereof is $10^{-4}$ mol or more per 1 kg of the medium.

7. The waste processing method as set forth in claim 1: wherein the hydrogen ion concentration of the medium in a supercritical state thereof is adjusted to $10^{-4}$ mol or more per 1 kg of the medium by addition of at least one of sulfuric acid and hydrochloric acid.

8. A waste processing method comprising:

a step of decomposing substantially all of an organic substance included in organic wastes into lower-molecular-weight products by holding the organic wastes in a medium, which is in a supercritical state thereof, for a predetermined time period;

a step of separating insoluble impurities contained in the organic wastes; and a step of oxidizing and decomposing the lower-molecular-weight products into carbon dioxide, and/or water by holding a mixture of an oxidant and the lower-molecular-weight products in the medium, which is in a subcritical state thereof, for a pre-determined time period.

9. The waste processing method as set forth in claim 8, further comprising:

a step of rendering the medium supercritical; and a step of obtaining a mixture of the medium in a supercritical state thereof and the organic wastes.

10. The waste processing method as set forth in claim 8: wherein the organic wastes contain a nitrate, a sulfate, a chloride, a phosphate, a silicate, or mixtures thereof.

11. The waste processing method as set forth in claim 8: wherein the medium is water, carbon dioxide, a hydrocarbon, or mixtures thereof.

12. The waste processing method as set forth in claim 8: wherein at least the stoichiometric value, necessary for completely oxidizing the organic wastes, of oxygen, air, hydrogen peroxide, ozone, or mixtures thereof is used as the oxidant.

13. The waste Processing method as set forth in claim 8, wherein the method further comprises a step of adding acid to the medium so that the hydrogen ion concentration of the medium, which is in a supercritical state thereof, is $10^{-4}$ mol or more per 1 kg of the medium.

14. The waste processing method as set forth in claim 8: wherein, by addition of at least one of sulfuric acid and hydrochloric acid, the hydrogen ion concentration of the medium, which is in a supercritical state thereof, is adjusted to $10^{-4}$ mol or more per 1 kg of the medium.

15. A waste processing method of decomposing an organic substance contained in organic wastes by holding a mixture of the organic wastes and a medium, which is in a supercritical state thereof, for a predetermined time period: wherein the method comprises a step of adding an acid to the medium in a supercritical state so that the hydrogen ion concentration of the medium is $10^{-4}$ mol or more per 1 kg of the medium.

16. The waste processing method as set forth in claim 15, further comprising:

a step of rendering the medium supercritical; and a step of obtaining a mixture of the medium in a supercritical state thereof and the organic wastes.

17. The waste processing method as set forth in claim 15: wherein the organic wastes contain a nitrate, a sulfate, a chloride, a phosphate, a silicate, or mixtures.

18. The waste processing method as set forth in claim 15: wherein the medium is water, carbon dioxide, or a hydrocarbon, or mixture thereof.

19. The waste processing method as set forth in claim 15: wherein the medium in a supercritical state thereof contains an oxidant.

20. The waste processing method as set forth in claim 15: wherein at least the stoichiometric value, necessary for completely oxidizing the organic wastes, of oxygen, air, hydrogen peroxide, ozone, or mixtures thereof is used as the oxidant.

21. The waste processing method as set forth in claim 15: wherein the hydrogen ion concentration of the medium, which is in a supercritical state thereof, is adjusted to $10^{-4}$ mol or more per 1 kg of the medium by addition of at least one of sulfuric acid and hydrochloric acid.

22. A waste processing method of decomposing an inorganic substance contained in inorganic wastes by holding a mixture of the inorganic wastes and a medium, which is in a supercritical state thereof, for a predetermined time period: wherein the method comprises a step of adjusting the hydrogen ion concentration of the medium by adding an acid to be $10^{-4}$ or more per 1 kg of the medium.

23. The waste processing method as set forth in claim 22, further comprising:

a step of rendering the medium supercritical; and a step of obtaining a mixture of the medium in a supercritical state thereof and the inorganic wastes.

24. The waste processing method as set forth in claim 22: wherein the inorganic wastes contain at least one of nitric acid and a nitrate.

25. The waste processing method as set forth in claim 22: wherein the medium is water, carbon dioxide, or a hydrocarbon, or mixtures thereof.

26. The waste processing method as set forth in claim 22: wherein the medium contains an oxidant.

27. The waste processing method as set forth in claim 22: wherein at least the stoichiometric value, necessary for completely oxidizing the inorganic wastes, of oxygen, air, hydrogen peroxide, ozone, or mixtures thereof is used as the oxidant.

28. The waste processing method as set forth in claim 22: wherein the hydrogen ion concentration of the medium is adjusted to $10^{-4}$ mol or more per 1 kg of the medium by addition of at least one of sulfuric acid and hydrochloric acid to the medium.

29. A waste processing apparatus comprising:

a reactor for decomposing substantially all of an organic substance included in organic wastes into lower-molecular weight products in a first medium which is in a supercritical state and substantially in the absence of oxidant;

means for feeding the organic wastes to the reactor;

means for feeding the medium to the reactor;

an oxidation reactor for oxidizing and decomposing the lower-molecular-weight products into carbon dioxide and/or water with an oxidant in a second medium which is in a subcritical state thereof;

means for feeding the oxidant to the oxidation reactor; and means for recovering a fluid produced in the oxidation reactor.

30. A waste processing apparatus comprising:

first means for decomposing substantially all of an organic substance included in organic wastes containing in a reactor into lower-molecular weight products by holding the organic wastes in a medium in a supercritical state thereof, and second means for subsequently, oxidizing and decomposing the lower-molecular-weight products into carbon dioxide and/or water by holding a mixture of the lower-molecular-weight products and an oxidant in the medium in a subcritical state thereof;

means for feeding the organic wastes to the reactor;

means for feeding the medium to the reactor; and means for feeding an oxidant to the oxidation reactor; and means for recovering a fluid produced in the reactor.

31. The waste processing apparatus as set forth in claim 29:

wherein the reactor has means for separating insoluble impurities contained in the organic wastes.

32. The waste processing apparatus as set forth in claim 29:

wherein each of the organic waste feeding means, the medium feeding means, and the oxidant feeding means has means for pressurizing the organic wastes, the medium, and the oxidant, respectively, and means for preheating the same, respectively, and the recovering means has decompressing means for decompressing a fluid produced in the reactor and means for cooling the fluid.

33. The waste processing apparatus as set forth in claim 29, further comprising:

means for detecting conditions of the medium in the reactor.

34. The waste processing apparatus as set forth in claim 29:

wherein the reactor has means for radiating ultraviolet ray or radiation to the content of the reactor.

35. The waste processing apparatus as set forth in claim 29:

wherein the recovering means comprises gas-liquid separating means, gas processing means, and liquid processing means.

36. The waste processing apparatus asset forth in claim 35:

wherein the gas processing means comprises a filter for removing a solid component, a radioactive material, or a hazardous substance contained in the gas, and a scrubber for recovering the radioactive material or the hazardous substance in the gas.

37. The waste processing apparatus as set forth in claim 35:

wherein the liquid processing means has means for aggregating inorganic ions contained in the liquid so as to precipitate.

38. The waste processing apparatus as set forth in claim 35:

wherein the liquid processing means has means for collecting a solid component contained in the liquid.

39. The waste processing apparatus as set forth in claim 35:

wherein the liquid processing means has ion exchange means for removing an ion component contained in the liquid.

40. The waste processing apparatus as set forth in claim 35:

wherein the liquid processing means has means for extracting/recovering inorganic ions contained in the liquid by allowing the liquid to be in contact with an extracting agent.

41. The waste processing apparatus as set forth in claim 35:

wherein the liquid processing means has means for solidifying liquid and/or sludge.

42. A waste processing apparatus comprising:

a reactor for decomposing an organic substance contained in organic wastes in a medium in a supercritical state thereof;

means for feeding the organic wastes to the reactor;

means for feeding the medium to the reactor;

means for adjusting the hydrogen ion concentration by feeding an inorganic acid into the reactor; and means for recovering a fluid produced in the reactor.

43. The waste processing apparatus as set forth in claim 42:

wherein the adjusting means has means for mixing the inorganic acid with the medium to be a pre-determined hydrogen ion concentration.

44. The waste processing apparatus as set forth in claim 42:

wherein the adjusting means comprises:

means for feeding an inorganic acid to the reactor;

means for measuring the hydrogen ion concentration in the reactor; and means for controlling a feeding amount based on a signal from the hydrogen ion concentration measuring means.

45. The waste processing apparatus as set forth in claim 44, wherein the reactor is provided with means for feeding an oxidant.

46. The waste processing apparatus as set forth in claim 45, wherein the adjusting means adjusts the hydrogen ion concentration according to the type of the organic wastes and a feeding amount of the oxidant.

47. A waste processing apparatus comprising:

first means for decomposing substantially all of an organic substance included in organic wastes in a reactor into lower-molecular-weight products in a medium which is in a supercritical state thereof, and second means for subsequently oxidizing and decomposing the lower-molecular-weight products into carbon dioxide and/or water with an oxidant in the medium which is in a subcritical state;

means for feeding the organic wastes to the reactor;

means for feeding the medium to the reactor;

means for feeding the oxidant to the reactor;

means for adjusting the hydrogen ion concentration in the reactor by adding an acid; and means for recovering a fluid produced in the reactor.

48. A waste processing apparatus comprising:

a reactor for decomposing substantially all of an organic substance included in organic wastes into lower-molecular-weight products in a first medium which is in a supercritical state and substantially in an oxidant-free state;

means for feeding the organic wastes to the reactor;

means for feeding the medium to the reactor;

an oxidation reactor for oxidizing and decomposing the lower-molecular-weight products into carbon dioxide and/or water with an oxidant in a second medium which is in a supercritical state thereof;

means for feeding the oxidant to the oxidation reactor;

means for feeding an acid and adjusting the hydrogen ion concentration in the reactor; and means for recovering a fluid produced in the oxidation reactor.

49. A waste processing apparatus comprising:

a reactor for decomposing an inorganic substance included in inorganic wastes in a medium which is in a supercritical state thereof;

means for feeding the inorganic wastes to the reactor;

means for feeding the medium to the reactor;

means for feeding an acid for adjusting the hydrogen ion concentration in the reactor; and means for recovering a fluid produced in the reactor.

50. The waste processing apparatus as set forth in claim 49:

wherein the reactor is provided with means for feeding an oxidant to the reactor.

51. The waste processing apparatus as set forth in claim 49:

wherein the acid feeding means has means for mixing an inorganic acid with the medium to be a predetermined hydrogen ion concentration.

52. The waste processing apparatus as set forth in claim 50:

wherein the acid feeding means adjusts the hydrogen ion concentration according to the type of the organic wastes and a feeding amount of the oxidant.

53. The waste processing apparatus as set forth in claim 49:

wherein the acid feeding means comprises:

means for feeding an inorganic acid to the reactor;

means for measuring the hydrogen ion concentration in the reactor; and means for controlling a feeding amount of the inorganic acid from the inorganic acid feeding means to the reactor based on a signal from the hydrogen ion concentration measuring means.

54. The waste processing apparatus as set forth in claim 49, wherein the recovering means comprises gas-liquid separating means, gas processing means, and liquid processing means.

55. The waste processing apparatus as set forth in claim 54:

wherein the gas processing means comprises:

a filter for removing a solid component, a radioactive material, or a hazardous substance contained in a gas;

and a scrubber for recovering the radioactive material or the hazardous substance in the gas.

56. The waste processing apparatus as set forth in claim 54:

wherein the liquid processing means comprises means for aggregating and precipitating inorganic ions contained in the liquid.

57. The waste processing apparatus as set forth in claim 54:

wherein the liquid processing means comprises means for collecting a solid component contained in the liquid.

58. The waste processing apparatus as set forth in claim 54:

wherein the liquid processing means comprises means for solidifying liquid and/or sludge.

* * * * *

UNITED STATES PATENT AND TRADEMARK OFFICE
CERTIFICATE OF CORRECTION

PATENT NO.: 6,090,291
DATED: July 18, 2000
INVENTOR(S): Akai et al.

It is certified that an error appears in the above-identified patent and that said Letters Patent is hereby corrected as shown below:

Title page, Item [57], in the Abstract, line 5, change "pre-determined" to --predetermined--; and line 12, change "pre-determined" to --predetermined--.

Claim 1, column 28, line 55, change "pre-determined" to --predetermined--.

Claim 8, column 29, line 30, change "pre-determined" to --predetermined--.

Claim 13, column 29, line 49, change "Processing" to --processing--.

Claim 36, column 31, line 50, change "asset" to --as set--.

Claim 43, column 32, line 29, change "pre-determined" to --predetermined--.

Signed and Sealed this

Twenty-fourth Day of April, 2001

Attest:

NICHOLAS P. GODICI

Attesting Officer

Acting Director of the United States Patent and Trademark Office